United States Patent
Yu et al.

(10) Patent No.: US 7,058,036 B1
(45) Date of Patent: Jun. 6, 2006

(54) METHOD AND SYSTEM FOR WIRELESS INSTANT MESSAGING

(75) Inventors: Terry T. Yu, Overland Park, KS (US); Robert W. Hammond, Overland Park, KS (US); Von K. McConnell, Leawood, KS (US); Baoquan Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 09/514,054

(22) Filed: Feb. 25, 2000

(51) Int. Cl.
*H04B 7/216* (2006.01)
*H04M 11/00* (2006.01)
*G06F 15/16* (2006.01)

(52) U.S. Cl. ............... 370/335; 370/342; 370/352; 370/392; 379/88.13; 379/88.17; 455/414.4; 709/206; 709/207

(58) Field of Classification Search ........ 370/352–356, 370/335, 342, 389, 392, 400, 410, 422; 379/88.12; 455/44.4; 709/206, 207, 230
See application file for complete search history.

(56) References Cited

U.S. PATENT DOCUMENTS

| 5,950,123 | A * | 9/1999 | Schwelb et al. | 455/414.4 |
| 6,097,961 | A * | 8/2000 | Alanara et al. | 455/466 |
| 6,301,609 | B1 * | 10/2001 | Aravamudan et al. | 709/207 |
| 6,333,973 | B1 * | 12/2001 | Smith et al. | 379/88.12 |
| 6,393,014 | B1 * | 5/2002 | Daly et al. | 370/352 |
| 6,421,707 | B1 * | 7/2002 | Miller et al. | 709/206 |
| 6,487,602 | B1 * | 11/2002 | Thakker | 709/230 |

OTHER PUBLICATIONS

ReadyCom Inc., http://www.readycom.com/rc_home.html, printed from the World Wide Web on Dec. 8, 1999.
Visitalk.com Free Services, http://www.visitalk.com/marketing/our_services.htm, printed from the World Wide Web on Dec. 8, 1999.

(Continued)

*Primary Examiner*—Frank Duong
*Assistant Examiner*—Melanie Jagannathan

(57) ABSTRACT

A wireless instant messaging system is disclosed. A mobile station (MS), such as a cellular telephone for instance, may be registered with an instant messaging (IM) server as being available to receive instant messages via an IM proxy. A user at an IM client terminal may then send an instant message destined for a user at the MS. The IM server may direct the message to a service node (SN), which may convert the message into an industry standard SMS message and send the SMS message to the MS. At the MS, a user may read the SMS message and engage a callback feature, which will establish a dial-up voice connection between the MS and the SN. The user at the MS may then speak an instant message response, and the SN may record the response as a compressed audio file. The SN may then send the compressed audio file as an attachment to an instant message back to the user at the IM client terminal. The IM client terminal may then play the spoken response message. The invention facilitates robust instant messaging communication, while avoiding the need for a user at the mobile station to engage in cumbersome text entry via a numeric keypad.

45 Claims, 11 Drawing Sheets

OTHER PUBLICATIONS

ZDNet: PC Week: Ready for instant voice messaging?, http://www.zdnet.com/pcweek/stories/news/0,4153,1017518,00.html, printed from the World Wide Web on Dec. 8, 1999.

FLASHCommerce—Visitalk.com Introduces Instant Voice Messaging, http://flashcommerce.com/articles/99/10/05/203356240.htm, printed from the World Wide Web on Dec. 8, 1999.

Gallagher, M.D. and Snyder, R.A., "Mobile Telecommunications Networking, Chapter 13 Short Message Service Functions", pp. 285-310 (1997).

* cited by examiner

Prior Art

METHOD AND SYSTEM FOR WIRELESS INSTANT MESSAGING

BACKGROUND OF THE INVENTION

1. Field of the Invention

The present invention relates to telecommunications services and more particularly to a method and system for providing wireless instant messaging.

2. Description of Related Art

Modern technology offers a number of ways for people to interact with each other over a telecommunications network. One of the most popular modes of communication over computer networks, for instance, is electronic mail (e-mail). In an e-mail system, a user at a first client terminal enters a message and sends the message to a destination user. An e-mail server on the network then receives the message and deposits it in an "in box" of the destination user. In turn, the destination user at a second client terminal may then retrieve the message from the in box, read the message and, if desired, prepare and send a response message in a similar manner.

Traditional e-mail communication, however, suffers from an inherent drawback: in order to fully communicate the message from the sending user to the destination user, the destination user must actively retrieve the message from a mailbox. If the destination user is involved with a particular application on the second client terminal, for example, he or she may need to temporarily pause that application, switch to an e-mail application, and open an in box in order to obtain the message.

Ideally, telecommunications should strive to simulate face-to-face interaction. In face-to-face interaction, there is no need to retrieve a message from an in-box; a "sent" message appears in real-time before the recipient. In this respect, therefore, e-mail communications leave something to be desired.

Another mode of network communication that has gained substantial popularity in recent years is "instant messaging." In a typical instant messaging arrangement, a user at one computer can type a text message to be delivered to a user at another computer, and the message is then delivered in substantially real time to the other computer for immediate presentation to and receipt by the other user. Advantageously, instant messaging thus avoids the need for the recipient to actively retrieve the message from a mailbox and therefore more closely approximates face-to-face communications.

Although instant messaging has been recently popularized by Internet Service Providers (ISPs) such as America Online, Inc., for instance, the concept dates back at least to early UNIX systems. Such systems included a TALK command that allowed a user at one UNIX terminal on a network to send a text message directly to another UNIX terminal on the network. In response to the TALK command, the UNIX operating system would establish a communication channel or "pipe" between a process associated with the first terminal and a process associated with the second terminal. The text message would then be sent along this pipe and would appear immediately on the monitor at the second terminal.

The recent popularity of instant messaging systems is due in large part to the growth of the Internet and Worldwide Web, and the concomitant desire to "be connected." Two or more users logged onto the Internet may be geographically dispersed but may still want to be able to engage in instant communications with each other, without the need to work through an e-mail server and mailboxes.

Communications over the Internet operate according to an established protocol suite known as TCP/IP (Transmission Control Protocol/Internet Protocol). Each computer terminal or "node" on the Internet is assigned a network address, referred to as an IP address, which defines the location of the terminal in the network. A message to be sent from one terminal to another is divided into a sequence of packets, referred to as TCP or UDP packets, which are then routed through the network to the destination IP address. At the destination, the packets are reassembled, and the message is reconstructed and presented to an end user.

Instant messaging over the Internet can be accomplished in a number of ways. By way of example, FIG. 1 illustrates one possible scenario. In the arrangement shown in FIG. 1, a first computer terminal 12 is coupled by a communications link 14 to a first gateway (GW) 16, and a second computer terminal 18 is coupled by a second communications link 20 to a second GW 22. GWs 16 and 22 each provide connectivity to the Internet, shown as IP network 24. Also connected to IP network 24 is an Instant Messaging (IM) server 26. GWs 16 and 22 and IM server 26 may be owned and operated by a single company, such as a single ISP for instance, or may be owned and operated by separate companies.

In practice, when a first user at terminal 12 logs onto the Internet, an IM client application running on terminal 12 may communicate with an IM server application running on server 26 in order to register the user/terminal as being available for instant messaging service. In doing so, the IM client may establish and provide to the IM server an instant messaging ID for the terminal. This instant messaging ID could comprise a combination of the terminal's IP address and a designated IM port (e.g., a TCP or UDP port) at the terminal, for example. The IM server 26 may then store this instant messaging ID in a database record linked with a name associated with the user, such as "User-1".

Similarly, when a second user at terminal 18 logs onto the Internet, an IM client application running on terminal 18 may provide an instant messaging ID for terminal 18 to the IM server 26, and IM server 26 may store this ID in a database record linked with a name associated with the second user, such as "User-2". The IM server may also provide the second user with an indication of other IM clients currently available to receive instant messages. For instance, the IM server may notify the IM client on terminal 18 that User-1 is currently on line and available for IM communication. (Similarly, the IM server may provide the first user with an indication that the second user is available to receive instant messages.)

To send an instant message to User-2, User-1 may invoke the IM client application on terminal 12, type in a text message, and instruct the IM client to send the text message to User-2. The IM client on terminal 12 may then interact with IM server 26 in order to route the text message to a destination IM address comprising the IP address and IM port of terminal 18. For example, the IM server could receive and forward the message to this address, or the IM server could map the user name "User-2" to this destination IM address and the IM client could route the message to the destination. At terminal 18, when the message arrives at the IM port, an IM client application could responsively pop up a window on a monitor and immediately display the message to User-2. In turn, User-2 could send a response IM to User-1 by a similar procedure.

While computers have traditionally been connected to the Internet or other such networks by landline (i.e., wired) connections, recent advances in wireless telecommunications have now opened the door for wireless network connectivity as well. At one level, for instance, a conventional computer can include or be coupled with a cellular radio modem, which can couple the computer with a wireless telecommunications network and in turn, with the Internet. FIG. 2 shows an example of this arrangement.

Referring to FIG. 2, a computer 28 is connected with a cellular modem 30. In accordance with conventional cellular radio telecommunications practice, the cellular modem 30 communicates over an air interface 32 with a cellular base station controller (BSC) 34, which is in turn coupled with a mobile switching center (MSC) 36. MSC 36 is, in large part, the wireless equivalent of a landline telecommunications switch (often referred to as a signal switching point or SSP). MSC 36 is in turn coupled with an "interworking function" (IWF) 38, which commonly serves as a wireless/IP gateway to transparently pass wireless protocol signals (e.g., CDMA, TDMA, etc.) from MSC 36 onto an IP network and vice versa. Thus, IWF 38 is coupled to an IP network 40, to which IM server 26 is also coupled. In an alternative arrangement (applicable throughout this disclosure), a base station controller such as BSC 34 could communicate directly with an interworking function such as IWF 38, i.e., without the need for an intermediate MSC.

The cellular modem 30, BSC 34, MSC 36 and IWF 38 in the arrangement of FIG. 2 may thus take the place of communications link 14 and gateway 16 in the arrangement of FIG. 1. Computer 28, like terminal 12 in FIG. 1, can run an IM client, which can interact with IM server 26 so as to facilitate instant messaging communications with a user at computer 28 as described above.

In addition, other methods for wireless Internet communications have been devised. One of the most significant developments in this regard has been the introduction of the HDML (handset display markup language) and WAP (wireless access protocol) communication standards. Both of these standards are designed to facilitate Internet access from small devices such as cellular telephones, personal data assistants (PDA), and the like. The idea is to implement a scaled down version of a web browser (client) on the device, and to provide a corresponding HDML or WAP server on the Internet that can interact with that browser. The HDML or WAP server can, for instance, send abridged versions of full web pages to the client HDML or WAP browser, suitable for display on a small screen.

FIG. 3 depicts an example of a WAP or HDML client/server arrangement for instant messaging. As shown in FIG. 3, a handheld (or other) device (such as a cellular telephone, PDA, etc.) 42 is arranged to communicate over an air interface 44 with a base station 46. Base station 46 is then coupled with an MSC 48, which is coupled with an IWF 50, which in turn provides connectivity with an IP network 52. (Alternatively the IM server could be coupled with a separate WAP server, or IM server functionality could be integrated within a WAP server. Similarly, the WAP server could be coupled with a separate IM server, or WAP server functionality could be integrated within an IM server.) Also connected to the IP network are a WAP server 54 and IM server 26. A WAP client application on device 42 may thus communicate over IP network 52 with WAP server 54. In turn, WAP server 54 may communicate over the IP network 52 with the IM server 26. Further, a scaled down IM client on device 42 may communicate over the IP network and via WAP server 54 with IM server 26.

Thus, in operation, a user at handheld device 42 could initiate a WAP session with WAP server 54 and, within the WAP session, an IM session with IM server 26. Consequently, the user at device 42 could send and receive instant messages just like a user at terminal 12 in FIG. 1 could do, but with the convenience of a wireless connection.

Still further, another type of messaging system exists for communications in a wireless network. This system is known as short message service (SMS). SMS provides for the communication of short text messages to or from a mobile station (MS) (e.g., a cellular phone, a pager, etc.) or other entity without establishing an active call connection with the entity. In general, the system may allow a person to simply type in a desired text message, indicate the directory number associated with a destination mobile station, and then transmit an SMS message encapsulating the desired text message. The telecommunications network then conveys the text message to the destination mobile station, where the message is typically displayed for receipt by an end-user.

The elements and operation of an exemplary SMS system are defined generally in an industry standard that has been published by the Telecommunications Industry Association (TIA)/Electronics Industry Association (EIA) as Interim Standard IS-41 ("Cellular Radiotelecommunications Intersystem Operations"). The entirety of this standard, including all revisions thereof (e.g., IS-41C, IS-41D, and so forth), is hereby incorporated herein by reference.

To provide SMS service, a wireless network may include a short message service center ("SMSC") (sometimes also referred to simply as a message center ("MC")), which is a functional entity that stores and forwards SMS messages. The store and forward function provides a method of sending short messages to their destination recipient or storing those messages if the recipient is unavailable to receive them. This store and forward function can generally be distinguished from the real-time delivery requirements of voice calls, although SMS messages may be delivered in real time.

According to IS-41, the message center can send messages to or from a functional entity known as a short message entity ("SME"). The SME is often an application entity that resides on an MS or other device. When the SME resides on an MS, it may be referred to as an MS-based SME. Alternatively, the SME can comprise, or reside on, another entity in a wireless or fixed network, i.e., in whether or not part of the wireless communications network. For instance, an SME can reside on a landline computer connected to the Internet.

A typical SME might be arranged to compose, store, dispose of, act upon, display and/or otherwise manage short messages. It might also be arranged to perform signaling functions to support other delivery features such as MS location and status queries, and mapping of destination addresses. In turn, a typical SMSC can forward messages to an SME, store short messages for later delivery to an unavailable SME, apply originating and terminating SMS supplementary services to short messages, and serve other functions.

By convention, each MS is registered in a home system. The home system includes a home location register ("HLR") that defines the services and features authorized for use by the MS. One such service may be SMS. When a mobile station enters a given serving system (typically comprising an MSC and one or more base stations), the serving system engages in signaling communication with the HLR in the MS's home system to notify the HLR where the MS is located and to obtain the MS's current profile. The serving system then stores the profile in a local register (visitor location register ("VLR") for reference).

Each MS-based SME is usually associated with an SMSC known as the "home SMSC" in the MS's home system. At various instances, such as when the MS first enters an SMS-capable serving system, the MS's HLR will send SME service profile information (e.g., origination and termination restrictions) to serving system along with MS related profile parameters, so that the serving system can know that the MS is qualified to receive and/or send short messages.

Typically, a given SMSC then maintains the mobile identification number (MIN) address information of the MSs that it serves. In the usual case, the MIN of an MS will be the directory number (i.e., telephone number) of the MS, but it could be some other identifier such as an IP address or e-mail address, for instance. In turn, the SMSC is typically addressable by the directory numbers or MINs of those MSs. When the SMSC receives a message for one of its MSs, it may then identify the location of the MS and forward the message via the serving system to the MS.

As further background, FIGS. 4 and 5 illustrate some of the signaling involved in traditional SMS processing, as described, for instance, in Michael D. Gallagher and Randall A. Snyder, "Mobile Telecommunications Networking With IS-41" (McGraw-Hill 1997). FIG. 4 first illustrates a scenario known as two-way-SMS (or mobile-originated SMS), in which one mobile station, MS-A (embodying SME-A), sends an SMS message to another mobile station, MS-B (embodying SME-B).

As shown in FIG. 4, at step 1, MS-based SME-A first sends an air interface message, SMD-REQUEST (SMD-REQ), embodying a short message to its serving system. At step 2, the serving system routes the short message to SME-A's SMSC (message center, "MC"), using an IS-41 SMSDeliveryPointToPoint Invoke (SMDPP) message. Such an SMDPP message may be routed over an industry standard SS7 signaling network to a network point code associated with the SMSC. Alternatively, the SMDPP message could be routed using TCP/IP, X.25 or another desired protocol. The SMSC then returns an "smdpp" acknowledgement message, and SME-A's serving system returns an SMD-ACK to MS-A.

At step 3, SME-A's message center sends an SMDPP message to the Destination SME's SMSC. In turn, at step 4, SME-B's message center sends an SMDPP message to SME-B's serving system. At step 5, SME-B's serving system then forwards the short message to the destination SME using the air interface SMD-REQ message, and SME-B responds with an acknowledgement SMD-ACK to signal acceptance of the SMD-REQ message.

An MS-based SME can be addressed by its host's MIN (e.g., the MIN of the mobile station on which the SME resides). In order to then determine which SMSC to route a message to for a given destination SME, an entity can maintain a table of MIN-to-SMSC addresses (e.g., MIN to SS7 destination point code, or MIN to IP address, for instance), as is often done today in IS-41 networks for routing IS-41 messages to an MS's HLR. Thus, for example, in FIG. 4, MS-A's serving system can maintain a table that indicates the address of the SME-A's SMSC for use in step 2, and SME-A's SMSC can maintain a table indicating the address of SME-B's SMSC for use in step 3.

Generally speaking, in order to terminate an SMS message to an MS-based SME, the SMSC that seeks to send the message must get a valid routing address for the system currently serving the SME. To facilitate this, IS-41 provides a special SMS_Address parameter that is conveyed to the HLR of an SMS-capable MS when the MS is registered in a new serving system. In addition, IS-41 provides an SMSRequest (SMSREQ) invoke message that can be used to request the current location of the MS-based SME.

FIG. 5 illustrates an exemplary set of processing functions that may be employed to register an MS-based SME (residing on MS-A) and to then terminate an SMS message to the SME. As shown in FIG. 5, when an SMS-capable MS is detected by a serving system, at step 1, the serving system sends a RegistrationNotification (REGNOT) invoke message to the MS's HLR. If the serving system is SMS-capable, the message includes the SMS_Address parameter, which can be used to route short messages to the serving system for delivery to the MS-based SME. For instance, if the short message transport network is SS7-based, the SMS_Address parameter may contain an SS7 point code and subsystem number. (Alternatively, as another example, if the transport network is IP-based, the SMS_Address parameter may contain an IP address.) When the serving system receives an SMDPP message addressed to this point code and subsystem number, it assumes the message is intended for a visiting MS-based SME that is specifically identified by address parameters in the SMDPP message.

In turn, when an SMSC seeks to send an SMS message to an MS-based SME, at step 2, it sends an SMSREQ message to the MS's HLR. If the HLR has a valid SMS_Address for the SME, then, at step 3, the HLR returns the SMS_Address parameter in an SMSRequest return result (smsreq) message. At step 4, the SMSC then uses the SMS_Address to route the SMDPP message to the system currently serving the SME, and the serving system in turn sends the message to the SME identified in the SMDPP message, using an SMD-REQ message.

In some instances, an SME may be unavailable to receive SMS messages. This might occur, for instance, (i) if the SME (e.g., an MS-based SME) is not registered with an HLR, (ii) if the SME is registered on an SMS-incapable system, (iii) if the SME is for some reason not authorized for SMS service on the current serving system, or (iv) if the host MS is out of radio contact or intentionally inaccessible (or if its message buffer is full). When an SME is unavailable and the SME's HLR receives a request for the SME's SMS_Address with an SMSRequest message for instance, the HLR may indicate the unavailability to the querying SMSC, by returning an SMS_AccessDeniedReason parameter (e.g., denied, postponed or unavailable).

In an SMSRequest message, in addition to providing the destination MS's MIN (and possibly its electronic serial number (ESN)), an SMSC can provide an SMS_NotificationIndicator parameter, which advises the HLR whether or not to notify the SMSC when the MS becomes available, in case the MS is currently unavailable. When an SMSC sends an SMSRequest message for an MS-based SME to the MS's HLR and the MS is unavailable, the HLR may then store an indication that the SMSC has a message waiting for the MS, unless the SMS_NotificationIndicator parameter indicates that the HLR need not notify the SMSC when the MS becomes available. When the MS then becomes available, the HLR may send an SMSNotification message to the SMSC, providing the SMS_Address of the MS-based SME, and advising the SMSC that it may send the stored message to the SME.

As noted above, SMS service can involve communication over various transport networks, such as conventional SS7 networks, IP networks (e.g., the Internet), and X.25 networks, for instance. In this regard, for example, an MSC, SMSC or other entity may be programmed as, or coupled with, an IWF to convert SMS messages from an SS7-encapsulated form into a form appropriate for IP-transport.

This may involve converting an SMS message into a stream of TCP/IP packets for transmission over the IP transport network. This arrangement may allow network access to external IP applications (e.g., SMEs) as well as inexpensive IP access between SMSCs belonging to different networks.

For instance, an SMS message generated in an SS7-based network can be conveyed over an IP network to a POP3 e-mail server, which can then convert the message into an Simple Mail Transfer Protocol ("SMTP") e-mail message and forward the e-mail message to a designated e-mail recipient (which may therefore be considered a type of SME). As another example, text messages generated and conveyed in an IP network (e.g., by an e-mail client) might be conveyed via the IWF to an SME in an SS7 network. An ISP or other entity may thus allow an Internet e-mail subscriber to send a text message to a designated MS-based SME referenced by a given directory number, for instance. As still another example, an SMSC or MSC in one carrier's network might convey an SMS message, via an IWF and an IP transport network, to an SMSC or MSC in another carrier's network, and the other SMSC or MSC may then deliver the SMS message to a designated recipient.

In summary, the existing art includes two ways to extend instant messaging service into the wireless domain. First, a computer terminal can be equipped for wireless communications with an IM server. As described above, this can involve providing a cellular modem for a conventional computer (e.g., desktop or laptop) and having the computer run a regular IM client application for communication with the IM server. Alternatively, it can involve the use of a handheld device (e.g., cellular phone or PDA) with wireless connectivity, which may employ a WAP/HDML browser to communicate with the IM server. Second, a computer terminal or MS could send a text message, which could be delivered to an MS as an SMS message.

SUMMARY OF THE INVENTION

The present invention stems from a realization that existing systems or concepts for providing instant messaging service in the wireless domain are deficient. In order to provide a robust wireless instant messaging system, several elements should preferably be present: (i) the IM client should be able to receive instant messages, (ii) the IM client should be able to respond to an instant message (or to otherwise initiate an instant message), and (iii) a mechanism should be provided to keep the IM system apprised of whether or not the IM client is available to receive instant messages. These three elements may be referred to as the receive, respond and status functions.

Of these functions, the receive function presents the least difficulty. A mobile station, such as a cellular telephone for instance, can be arranged to receive what may be characterized as an instant message in several ways as noted above. In one arrangement, for example, the MS could establish an on-line WAP or HDML session and thereby connect with an IM server. Once connected, the IM server can then route instant messages to the MS. This arrangement, however, would require the MS to be programmed with a WAP or HDML client application, which could increase cost and complexity. Further, this arrangement would require the MS to be actively engaged in the WAP or HDML session in order to receive the instant message. Therefore, when an MS is not in such a session, instant messages would not arrive. Further, an active WAP or HDML session can place high demands on bandwidth and battery power and can therefore be very costly. In addition, while a user is engaged in a WAP or HDML data session, it is possible that the user may be prevented from concurrently engaging in other data sessions.

Instead, the MS could be arranged to receive SMS messages as the instant messages. With existing technology, an MS can be programmed to display an SMS message without the need to establish an active call connection and without the need to engage in an "on-line" WAP or HDML session. Further, as noted above, an SMS message can be sent from an IP network to a mobile station. Therefore, using SMS would facilitate instant messaging communication from a landline IM client and a wireless IM client.

Turning to the respond function, however, more difficulty arises. In the existing art, several methods exist for an MS to send a message that, as presently contemplated can be characterized as an instant message. First, as noted above, the MS can employ mobile-originated SMS. For purposes of responding to an SMS message, IS-41 conveniently defines an SMS_OriginatingAddress parameter, which is conveyed in the header of an SMDPP message and defines the routing address (e.g., the MIN or directory number) of an originating MS-based SME. Thus, if the MS receives an "instant" SMS message from another MS, the directory number of the sending MS could be displayed at the receiving MS together with the message text. The receiving MS may then be programmed to allow the user to press a function key that would automatically send a response message back to that originating address.

Unfortunately, however, the SMS_OriginatingAddress parameter is designed to convey the routing address of only an originating MS-based SME. If the initial instant message came from an IP-based terminal (such as a computer connected to the Internet for instance), the SMS_OriginatingAddress might not carry the IP address of the initiating terminal. Further, even if it did and the MS could readily send a response message back to that IP address, problems would exist. For instance, some mechanism would need to be in place on the IP terminal to facilitate instant display of the response message. The IP terminal, for example, might need to be running an SME client application that would effectively simulate the SMS-display function of a mobile station, in order to pop up an SMS message for presentation to a user. Of course, such a requirement would again increase cost and complexity.

In addition, a user would encounter difficulty in entering a response text message at a mobile station. This is because, with current technology, the only input interface available at most mobile stations (e.g., cellular phones) for this purpose is a numeric keypad with letters indicated on the keys. The process of entering text through such a keypad, however, is exceptionally cumbersome. For instance, to enter the simple message "Hello Mom," the user, after some thought, might have to press the following keys: 4-4/3-3/5-5-5/5-5-5/6-6-6 (HELLO) 6/6-6-6/6 (MOM). Although recent advances in numeric keypad text entry (such as phonetic entry) have reduced this burden somewhat, the burden still exists.

This difficulty of entering a response message from an MS would exist in both a WAP/HDML session and a mobile-originated SMS scenario, since, in either case, a user at the MS might need to input a text message to send as an instant message. The difficulty could be reduced to some extent in an WAP/HDML session, by presenting the user with menu choices of canned responses, such as "Yes", "No", or "We'll talk later", which the user could select by pressing designated keys on the MS. However, such canned responses are also inherently limiting.

Other text entry mechanisms exist of course, such as the handwriting recognition software now commonly found on many PDAs for instance. However, these other text entry mechanisms are not yet readily available on many other types of mobile stations, such as many cellular phones for example.

Turning next to the status function, still additional difficulty arises. If a mobile station establishes a WAP or HDML session and thereby connects with an IM server, then, as described above, the IM server would know that the MS is available for instant messaging. The IM server may thus conveniently notify other IM clients that the MS is available. However, this again necessitates an active on-line session with a WAP/HDML server and an IM server, which suffers from the disadvantages noted above. Further, since many existing mobile stations do not have this capability or may not be actively in such a session, this is not a robust solution.

The present invention provides a solution to the foregoing problems, in the form of an improved method and system for wireless instant messaging. With the benefit of the present invention, a user at an MS can receive an instant message and readily respond to the instant message without the need for the MS to be engaged in an on-line WAP/HDML session and without having to engage in cumbersome text entry. (By the same token, the invention does not necessarily exclude these or other possibilities.) Further, the present invention provides a mechanism for alerting an IM system of the availability of mobile stations for IM communications.

According to an exemplary embodiment of the invention, a user at an instant messaging client terminal may send an instant message destined for a user at a mobile station. An instant messaging server may direct the message to a service node, which may convert the message into an industry standard SMS message and send the SMS message to the mobile station (possibly via an SMSC or a bulk message gateway). At the mobile station, a user may read the SMS message and engage a callback feature, which will be set to establish a dial-up voice connection between the mobile station and the service node.

The user at the mobile station may then speak an instant message response, and the service node may record the response as a compressed audio file. The service node may then send the compressed audio file as an attachment to an instant message back to the user at the instant messaging client terminal. The instant messaging client terminal may then play the spoken response message. In this way, the invention can facilitate robust instant messaging communication, while avoiding the need for a user at the mobile station to engage in cumbersome text entry via a numeric keypad.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
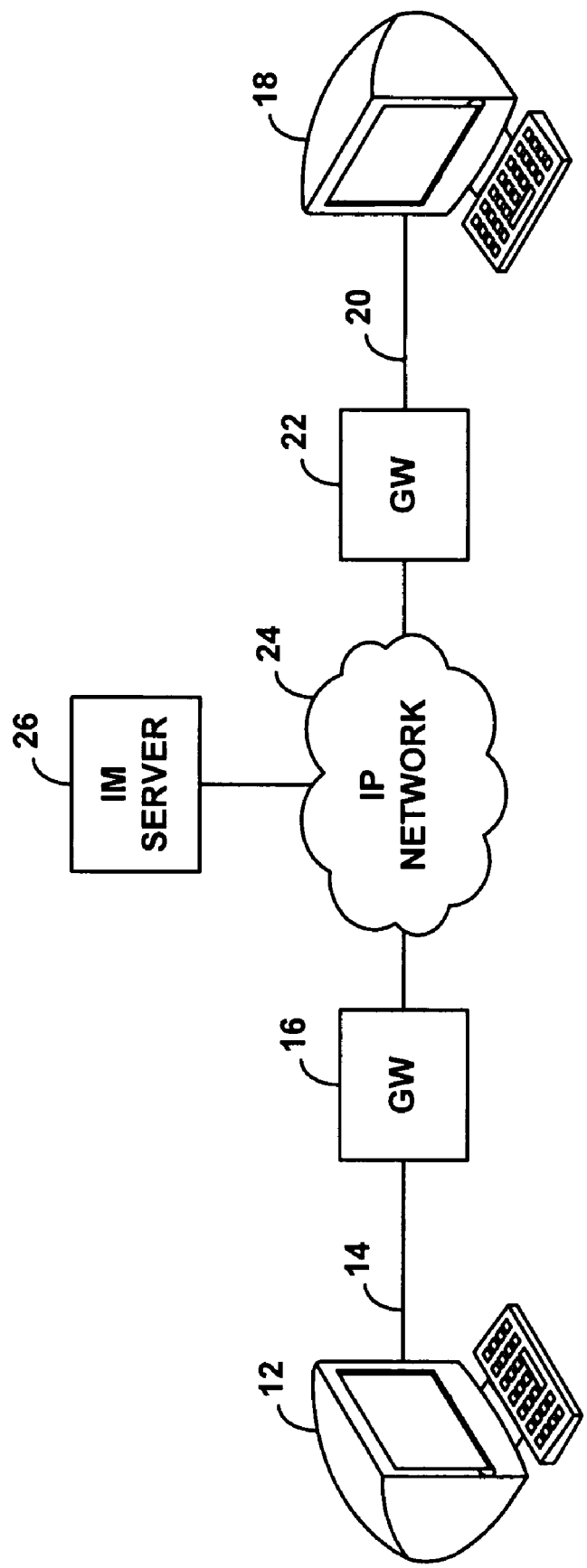
FIG. 1 is a block diagram illustrating an instant messaging system for landline computers.
Figure 2:
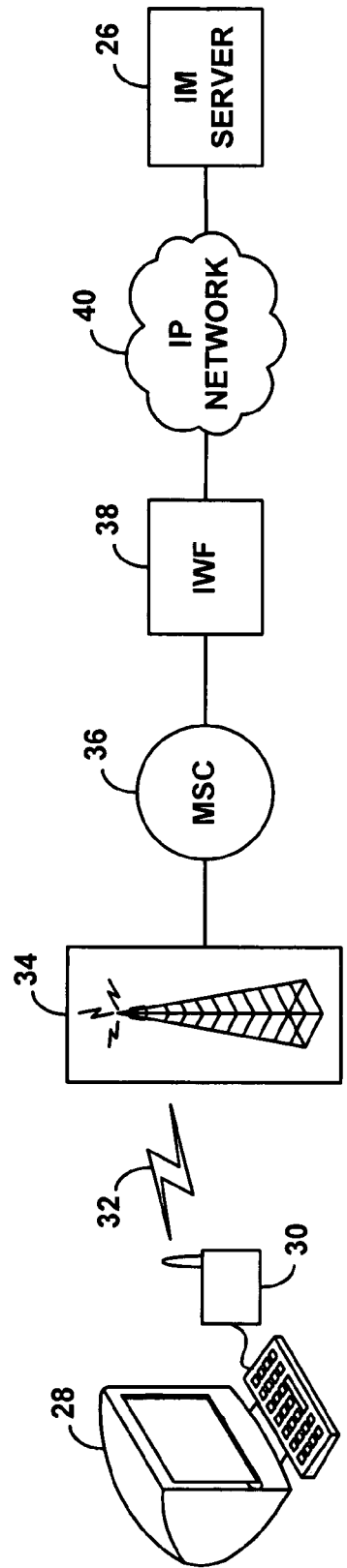
FIG. 2 is a block diagram illustrating an instant messaging system for a wireless-connected computer.
Figure 3:
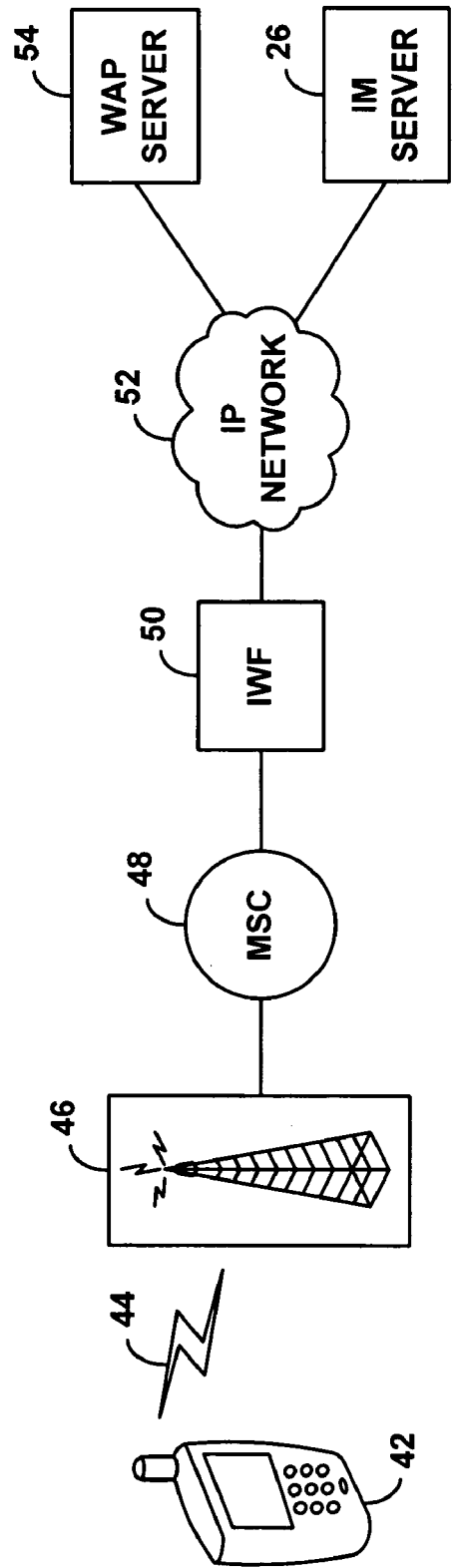
FIG. 3 is a block diagram illustrating an instant messaging system for a mobile station such as a cellular telephone.
Figure 4:
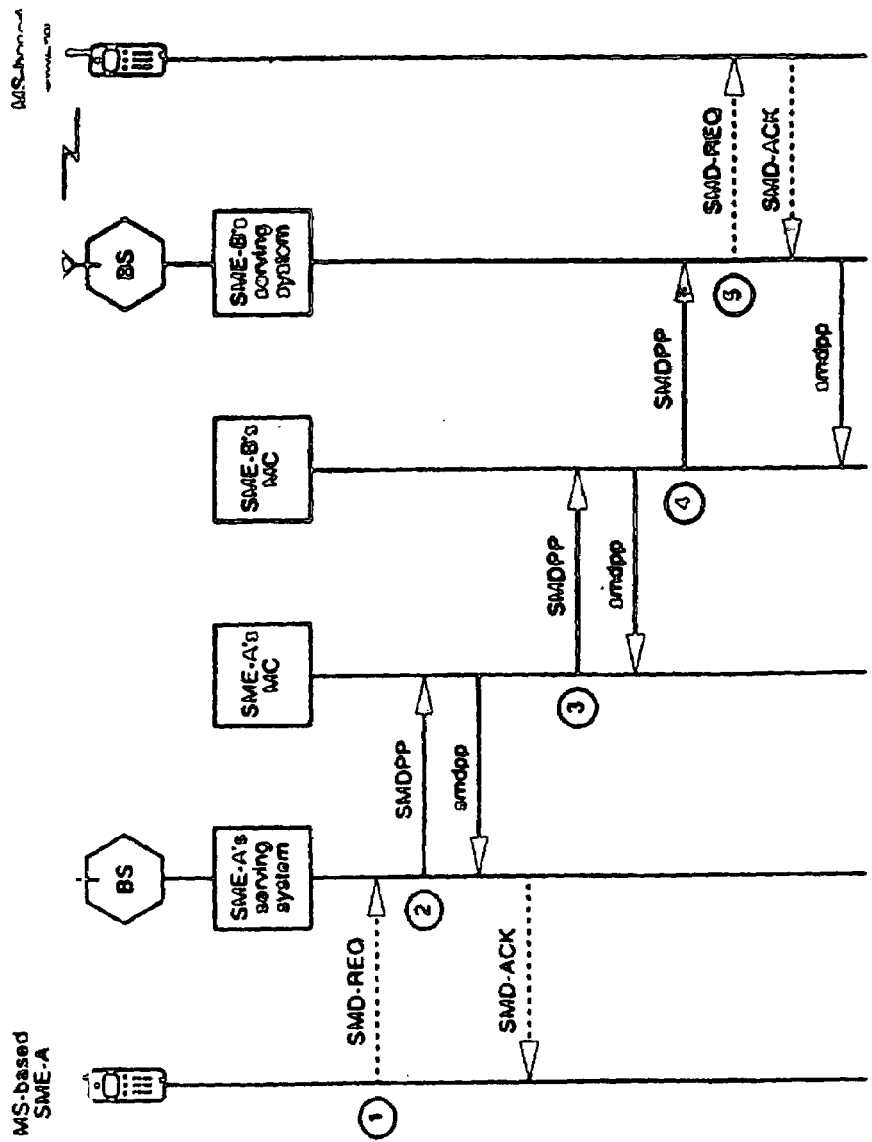
FIG. 4 is a process flow diagram illustrating communication of a short message from a first MS to a second MS.
Figure 5:
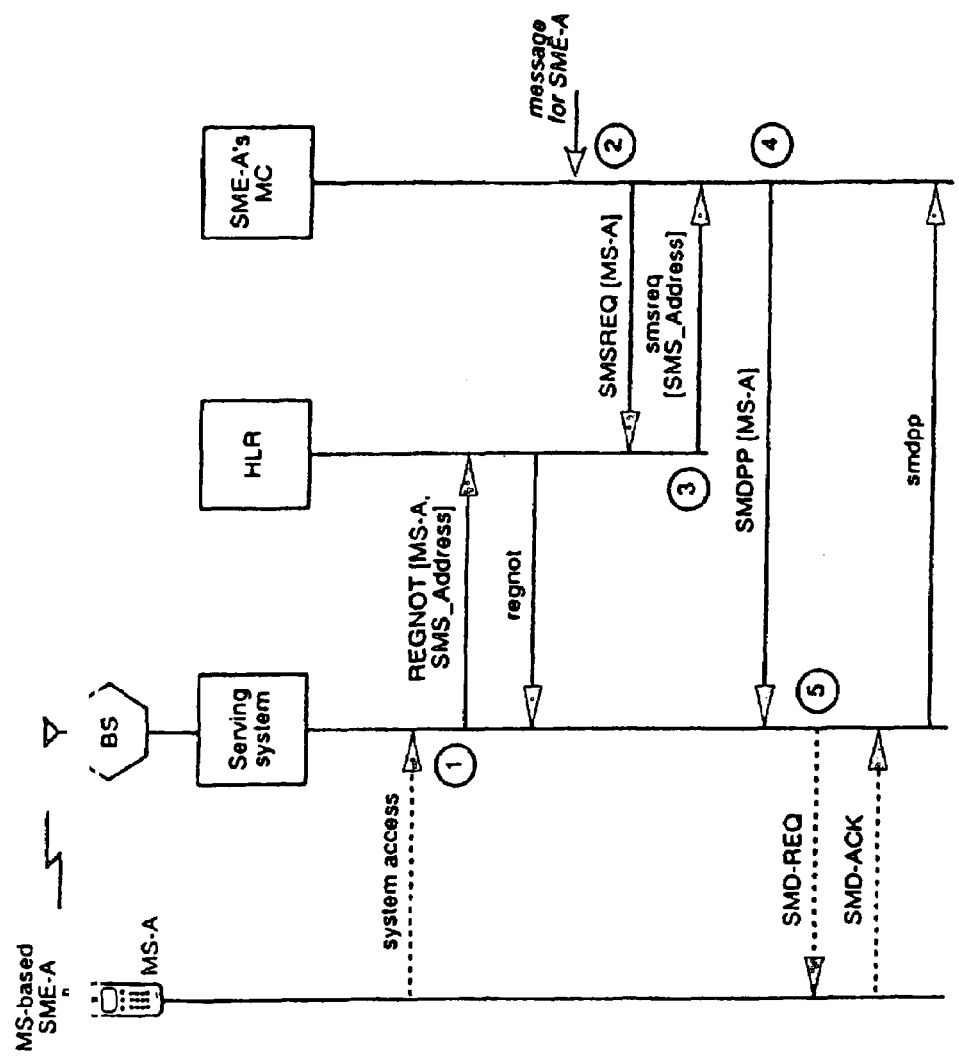
FIG. 5 is a process flow diagram illustrating registration of an MS-based SME and termination of a short message to the SME.
Figure 6:
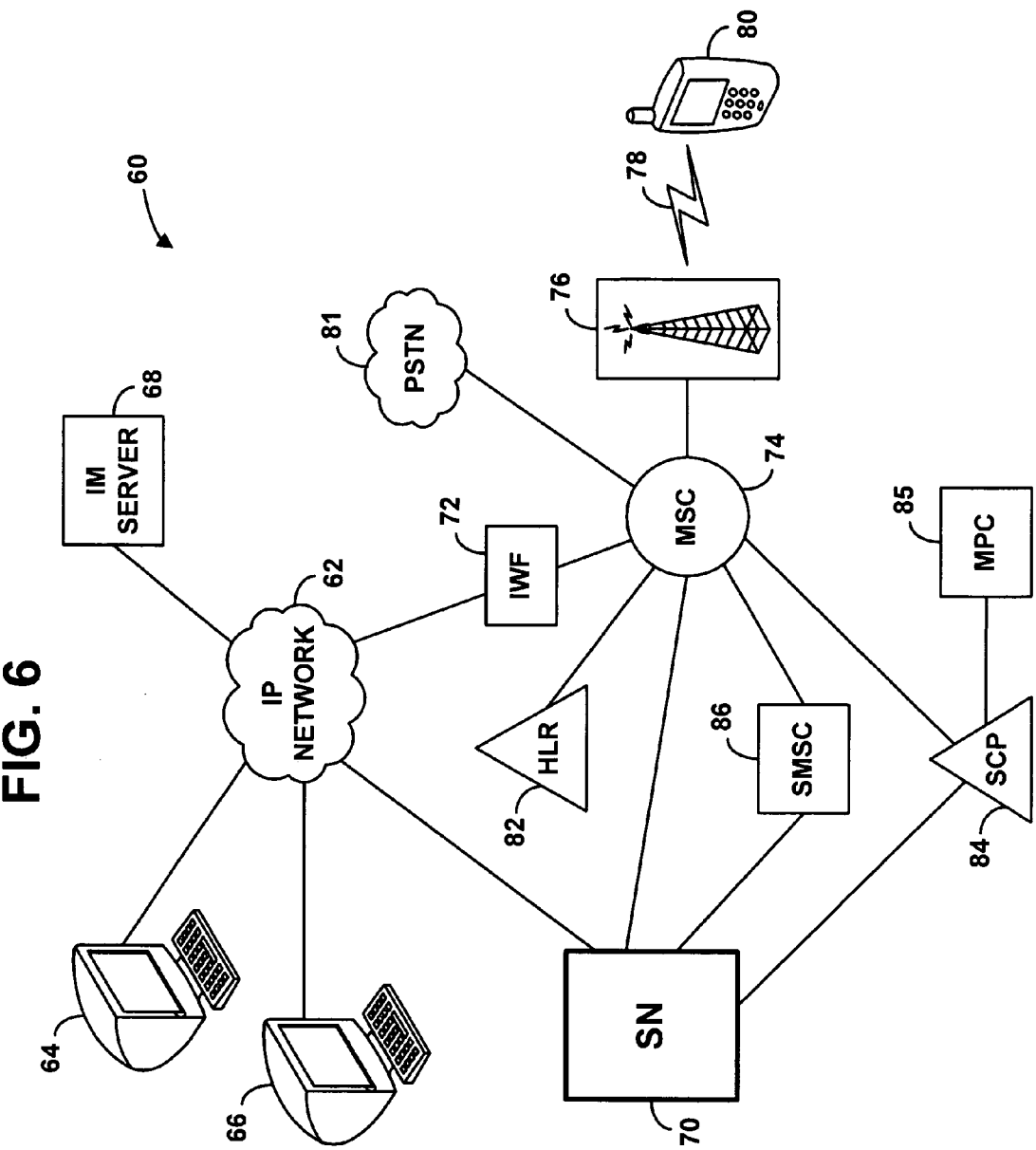
FIG. 6 is a simplified block diagram illustrating a telecommunications network in which an exemplary embodiment of the present invention may be employed.

Referring to the drawings, FIG. 6 illustrates a simplified block diagram of a telecommunications network 60 in which an exemplary embodiment of the present invention can be employed. This and other arrangements described herein are shown for purposes of illustration only, and those skilled in the art will appreciate that other arrangements and other elements (e.g., machines, interfaces, functions, etc.) can be used instead, additional elements may be added, and some elements may be omitted altogether.

Further, as in most telecommunications applications, those skilled in the art will appreciate that many of the elements described herein are functional entities that may be implemented as discrete components or in conjunction with other components, in any suitable combination and location. Still further, various functions described herein as being performed by one or more entities may be carried out by a processor executing an appropriate set of machine language instructions stored in memory. Provided with the present disclosure, those skilled in the art can readily prepare appropriate computer instructions to perform such functions.

1. Network Architecture

As shown in FIG. 6, exemplary network 60 includes an IP network 62, such as the Internet or an intranet for instance. Shown connected to network 62 are two exemplary IM client terminals 64, 66, an IM server 68, a service node 70, and an IWF 72. In typical practice, each of these entities may be coupled with the IP network by a suitable TCP/IP link, which may comprise network servers (e.g., local area network (LAN) servers), gateways, landline links, wireless links, and/or any other components.

Exemplary IM client terminals 64, 66 are shown as conventional personal computers. In a preferred embodiment, each terminal is a multimedia computer having a display monitor, a keyboard for text entry, and a microphone and speakers. However, the terminals can take any other desired form. For instance, an exemplary IM client terminal could be a handheld device such as a cellular telephone, pager, PDA or the like, or could take other forms now known or later developed. Each IM client terminal preferably includes a processor programmed to run an IM client application, to interface with an IM server application on the network.

Exemplary IM server 68 may comprise a high capacity computer station or other entity, which may include or be interconnected to a database storage device (not shown) or other storage device (e.g., a computer with a large cache memory). Generally speaking, the IM server is an entity that might coordinate and/or facilitate instant messaging communications between IM client terminals 64, 66. Thus, for example, the IM server might run an IM server application, which, as described above, can register IM clients, notify IM clients of other IM clients available for instant messaging service, and route instant messages from one IM client to another. The specific arrangement, functionality and operation of IM server 68 is not critical to this invention. IM server 68 may, for instance, be integral to an ISP server.

Exemplary IWF 72 serves to communicatively couple IP network 62 with a wireless telecommunications network, to convert between circuit-switched voice and/or data communications on the wireless network side and packet sequences appropriate for transport over network 62 on the other side. An example of a suitable IWF is manufactured by 3Com Corporation, of Santa Clara, Calif. (It should be understood that, in an alternative arrangement, an integrated Voice over IP network or Packet Data Serving Node (PDSN) architecture could be provided, which could avoid the need for the IWF; thus, for instance, references throughout this description to an IWF can be replaced with references to a PDSN.)

IWF 72 is shown coupled to an MSC 74, which may be part of a serving system in a wireless telecommunications network. In practice, IWF 72 will hang off a trunk of MSC 74. By convention, MSC 74 is in turn coupled with a BSC 76, which is arranged to communicate over an air interface 78 with a mobile station 80. (As noted above, BSC could additionally or alternatively be coupled more directly with IWF 72.) In addition, MSC 74 is shown coupled to the public switched telephone network (PSTN) 81, over which the MSC may communicate with other switches in landline and wireless networks.

Mobile station 80 may take any suitable form. In an exemplary embodiment, however, it will comprise a handheld device such as a cellular telephone. MS 80 preferably includes the circuitry, software, antenna, microphone, speaker, display and numeric keypad that are conventionally used for robust communication over a cellular telephone network.

MSC 74 is further coupled via a signaling link with an HLR 82. By convention, HLR 82 may be owned and operated by a service provider and could serve as the home register for mobile stations in the geographic area served by MSC 74. HLR maintains service profiles for each of its registered mobile stations. When one of those mobile stations enters a given serving area, the serving system will send a REGNOT message to the mobile station's HLR to get the mobile station's service profile, and the serving system will store that profile in a local VLR (not shown). A service profile for MS 80 may indicate that MS 80 subscribes to SMS service and is therefore capable of sending and receiving SMS messages.

In addition, the HLR will maintain an indication of the location of each of its registered mobile stations. This indication is used for terminating calls to the HLR's mobile station. In particular, when a network switch in PSTN 81 receives a request to terminate a call to one of the mobile stations, it may send a query to the mobile station's HLR, which will return a response indicating where in the network the mobile station is located. The switch may then route the call to that location.

MSC 74 is also coupled with a service control point (SCP) 84, which can conventionally serve to provide supplementary services for calls handled by the MSC. SCP 84 may be a Telcordia SCP, which typically comprises a number of functional components and is therefore also referred to as an Integrated SCP or "ISCP."

SCP 84 will typically include a database that defines special service profiles for various mobile stations. When MSC 84 receives a request to place a call to or from an MS in its serving system, MSC 84 may consult its VLR profile for that MS, which may direct the MSC to query SCP 84 for call handling instructions. SCP 84 may then consult its service profile database and determine that it needs to perform a specified function for the call. Thus, SCP 84 may responsively carry out programmed service logic for the MS and then send a response message to the MSC. As an example, the response message might direct the MSC to route the call to a particular destination, indicated by a network routing number for instance.

In addition, SCP 84 may include or be coupled with a mobile positioning center (MPC) 85, which is typically an application entity capable of identifying the location of mobile stations. Well known industry standards define the MPC entity. (Although FIG. 6 shows MPC 85 as an entity separate from SCP 84, MPC 85 may more likely reside on SCP 84.) The MPC will typically communicate with positioning determining equipment (PDE), which is also defined by industry standards. The PDE can technically determine the location of a mobile station and advise the MPC. The MPC may then store this information and/or provide the information to other entities. Thus, for instance, SCP 84 may request MPC 85 to provide the location of MS 80, and MPC may respond accordingly.

MSC 74 is further coupled to an SMSC 86. As described in the background section above, SMSC 86 can serve a store and forward function for SMS messaging as defined by IS-41. When MS 80 registers in a given serving system, the serving system sends a REGNOT message to the MS's HLR 82, including an SMS_Address parameter indicative of the location of MSC 74. SMSC 86 may then receive an SMS message addressed to a MS served by MS 74. In response, SMSC 86 may query HLR 82 to find out where MS 80 is located, and HLR 82 would respond with the SMS_Address parameter. SMSC 86 may then route the SMS message to MSC 74, and MSC 74 could then deliver the SMS message to MS 80 for display to a user.

Alternatively or additionally, a bulk messaging gateway (BMG) (not shown) may be provided. The BMG may serve to store and forward SMS messages as well. For instance, an entity could send an SMS message that is destined for MS 80 to the BMG. The BMG could then forward the message to SMSC 86, and SMSC 86 could deliver the message to MSC 74 for transmission to MS 80 as described above.

At the core of the exemplary embodiment is service node (SN) 70, which will also be referred to as a wireless instant messaging gateway (WIMG). SN 70 may be an IBM multiservices platform or may take another suitable form.

SN 70 serves as an IM proxy or agent for MS 80. When an IM client (generally, a "station" or "terminal") sends an instant message to MS 80, SN 70 receives the message, converts it to a form suitable for transmission to MS 80, and transmits the message to MS 80. Similarly, when MS 80 sends an instant message destined for an IM client, SN 70 receives the message, converts it to a form suitable for transmission to the destination IM client, and transmits the message to the destination IM client.

Figure 7:
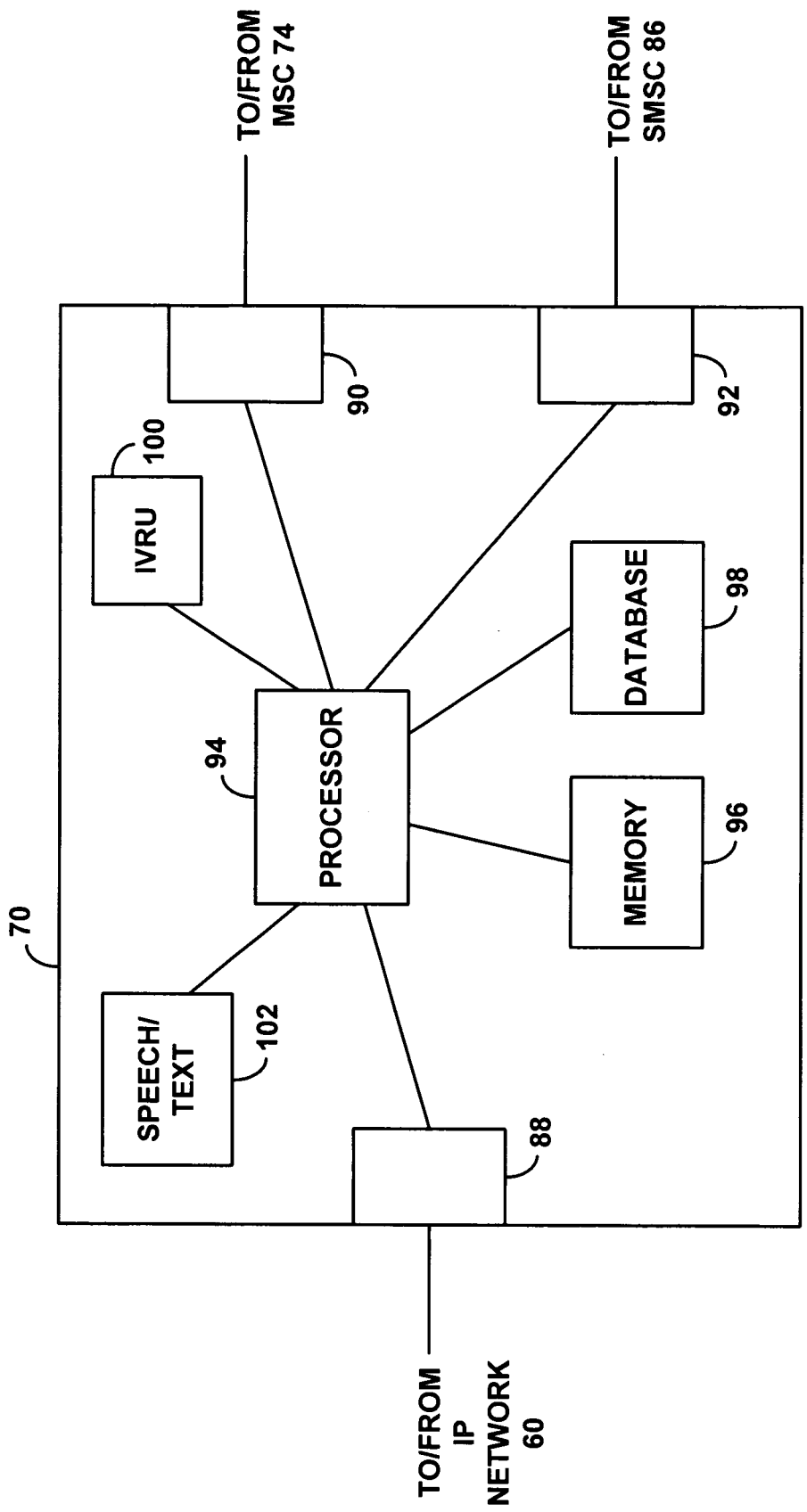
FIG. 7 is a simplified block diagram illustrating a wireless instant messaging gateway in accordance with an exemplary embodiment of the present invention.

FIG. 7 illustrates an exemplary embodiment of a machine such as SN 70 in greater detail. Referring to FIG. 7, exemplary SN 70 includes interfaces 88, 90, 92 for communicating respectively with IP network 62, MSC 74 and SMSC 86. Interface 88 may be coupled with a TCP/IP link, such as a dedicated frame network or broadband pipe, to IP network 62. Interface 90 may be coupled by a telephony link, such as one or more T1 lines for instance, to MSC 74. Interface 92 may be coupled by an SS7 signaling network with SMSC 86. Of course, these links and interfaces may take other forms as well. (In addition, SN 70 may communicate with other entities, such as SCP 84, for instance, over these or other interfaces).

Exemplary SN 70 includes a processor 94, a memory 96, and an IM database 98. The memory preferably includes a set of machine language instructions executable by the processor to perform functions described herein.

In an exemplary embodiment, SN 70 may thus act as an advanced IM client with respect to IM server 68, and SN 70 acts as an SMS entity with respect to SMSC 86. Thus, on one hand, SN 70 may send and receive IM messages to and from IP network 62, and, on another hand, SN 70 may send and receive SMS messages to and from SMSC 86. SN 70 may convert between SMS messages and IP communications. For instance, SN 70 may receive an SMDPP message from SMSC 86 carrying a text message and may then generate and send a packet sequence conveying that text message as payload to an entity on IP network 62. Similarly, SN 70 may receive a packetized text message from IP network 62 and may then generate and send an SMDPP message conveying that text message as payload to SMSC 86, for delivery as an SMS message to MS 80.

In addition, SN 70 preferably includes IVRU (intelligent voice response unit) functionality and text/speech conversion functionality (which may, for instance, include a large vocabulary and flexible grammar and natural speech recognition functionality), represented respectively by blocks 100 and 102 in FIG. 7. IVRU 100 allows SN 70 to engage in voice and/or DTMF communications via interface 90 and MSC 74 with a user at MS 80. For instance, IVRU 100 may provide voice prompts to the user, and IVRU 100 may record speech or other audio signals provided by the user. In addition, for example, IVRU 100 may prompt and allow the user to press certain DTMF keys on MS 80 in order to invoke desired functions.

Text/speech converter 102 allows SN 70 to convert between text messages and speech signals. For instance, if IVRU 100 receives a speech signal from a user at MS 80, text/speech converter 102 may convert that speech signal into a text message representative of the spoken words and send that text message to an entity on IP network 62. Similarly, if SN 70 receives a text message from IP network 62, text/speech converter 102 may convert that text message into a speech signal representative of spoken words and send that speech signal to a user at MS 80. The text/speech converter may convert in the other direction as well.

2. Operation a. Overview

In operation, an exemplary embodiment of the present invention works as follows. First, when a user at MS 80 is available for instant messaging, a registration message is provided to IM server 68, advising the IM server that the user at MS 80 is available but pointing to SN 70 as the network address to be used for instant messaging with the user. IM server 68 may in turn inform other IM clients that the user is available. When a user at an IM client then sends an IM message to the user at MS 80, the message will go to SN 70, pursuant to the registration at IM server 68. The message will preferably identify the network address of the IM client (effectively as a return address) or other such address associated with the IM client.

When SN 70 receives the message, in the exemplary embodiment, it will preferably establish and record a wireless instant messaging key (WIM), which SN 70 can use later to correlate a response from MS 80 with the IM client that sent the initial message and to be able to forward the response to the appropriate location.

The WIM key, for instance, can be the directory number of MS 80 plus a code that can distinguish each instant message sent to MS 80 for which a response is pending. Conveniently, the code can be a directory number of a port on SN 70 that is arranged to receive incoming calls. (Preferably, there should therefore be a sufficient number of such ports to handle as many instant messages as are statistically expected to be handled at once for a typical wireless IM client.) A benefit of using such a code is that, when a response message from MS 80 arrives on that port, the SN can readily identify the WIM key as a combination of (i) the directory number of the calling entity, MS 80 and (ii) the directory number of the port. SN 70 then correlates the WIM key with the network address of the IM client that initiated the message by, for instance, storing the WIM key and IM client address in a database record. Alternatively, for instance, the WIM key could be simply the directory number of MS 80.

Upon receipt of the message, in the exemplary embodiment, SN 70 will then convert the message into an SMS message and forward the SMS message to MS 80. As is known in the art, an SMS message may carry a callback number, to which a suitably equipped receiving-MS can initiate a call when instructed to by a user. This feature is typically invoked in the art to allow a user at an SMS-capable MS to place a call to the sender of an SMS, often by simply pressing a function key on the MS keypad. In the exemplary embodiment, SN 70 will include as the callback number in the SMS message the directory number of the specified port at SN 70.

According to the exemplary embodiment, when a user at MS 80 receives the instant message (in the form of an SMS message, in this example) and engages the callback feature, a call connection is thereby established between MS 80 and the port on SN 70 associated with the callback number. When SN 70 receives this call, it identifies the calling number (the directory number of MS 80) and, knowing the port on which the call arrived, identifies the WIM key. Consequently, by reference to the previously-established database record, SN 70 identifies the network address of the IM client that sent the instant message to MS 80.

With the call connection established, SN 70 then prompts the user at MS 80 to speak a response to the instant message. The user conveniently speaks a response, and SN 70 records the response as a compressed audio file, such as a WAV file for instance. SN 70 then sends the audio file to the initiating IM client, preferably encapsulated as part or all of the payload in an instant message. When the initiating IM client receives the instant message, in an exemplary embodiment, the IM client will then play the audio file to the initiating user, thereby completing the IM response.

b. Example Operation

A first element of this process is registering the user and/or the MS itself as being available to engage in instant messaging, i.e., as being an active IM client. The user/MS may become available, for instance, when MS 80 is powered on, when MS 80 is qualified in a new serving system (e.g., an SMS-capable serving system), when the user has elected to be available for instant messaging, or in other desired instances.

In an exemplary embodiment, to register the user and/or the MS as being available to engage in instant messaging, a registration message may be sent to IM server 68. The particular format of the IM registration message may depend on requirements of the IM server, which may vary from case to case. However, the registration message at least preferably includes indications of (i) a network address for instant messaging with MS 80, and (ii) a user ID. The network address may be an IP address and port of interface 88 at SN 70 and may also be referred to as the destination IM address for MS 80. The user ID may be the name of the user at MS 80, perhaps with an indication of the fact that the user is a "wireless" user.

The IM registration message could be sent by any suitably-informed entity, including, for instance, HLR 82, SCP 84, or, most preferably, SN 70. By way of example, when MS 80 is powered on in a given serving system, the MSC currently serving MS 80 will conventionally send a REGNOT message to MS's HLR. The profile that the HLR maintains for the MS may indicate that, in response to a REGNOT message, the HLR should send an IM registration message via IP network 62 (link not shown) to the IM server. As another example, HLR 82 could be programmed to notify SCP 84 when MS 80 registers with HLR (i.e., in response to a REGNOT message), or SCP 84 could otherwise learn that MS 80 has been powered on. In turn, SCP 84 could then send an IM registration message via IP network 62 (link not shown) to the IM server.

As yet another example, an entity such as SCP 84 could be programmed to notify SN 70 when MS 80 becomes available for instant messaging, and SN 70 can then send an IM registration message to the IM server. This process can operate as follows, by way of example. First, SCP may include a service profile for MS 80. This service profile can include an indication that the MS subscribes to instant messaging service. When the MS is powered up, MSC 74 will conventionally send a REGNOT message to HLR 82 and may be programmed to also send a REGNOT message to SCP 84. When SCP 84 receives the REGNOT message, it may check the service profile for the MS and determine that the MS subscribes to instant messaging service. The service profile and logic on SCP 84 may then responsively direct SCP 84 to send a message to SN 70, advising SN 70 that MS 80 is active (and/or instructing SN 70 to register MS 80 with the IM server).

SN 70, in its capacity as an IM client, may then interact with IM server 68 and send an IM registration signal to IM server. The registration signal may inform IM server 68 that user "MS 80" (or other user name) is available for instant messaging service at an IP address and IM port associated with SN 70 interface 88. Thus, to the knowledge of the IM server, instant messages can be sent to MS 80 at that IP address and IM port.

Communication of messages between SCP 84 and SN 70 may be carried over a TCP/IP link (not shown). A suitable protocol to facilitate this communication is defined by Bellcore's ISCP-IP Interface Specification, Version 5.0, Special Report SR-3511, Issue 2, January 1997 ("SR-3511"). The entirety of this Bellcore specification is incorporated herein by reference.

In addition or alternatively, SCP 84 or another entity could be programmed to automatically turn on or off the IM availability of MS 80 in response to any designated stimulus. For example, the service profile applicable for MS 80 in SCP 84 may indicate that, at specified times or in response to specified events (such as call processing events), MS 80 should become available for instant messaging. In response to such stimuli, SCP 84 may then send an IM registration message to the IM server or cause another entity (such as SN 70 for instance) to send an IM registration message. A similar process may occur to cancel or turn off the IM registration. As another example, the designated stimulus may be a predefined feature code (e.g., "*34") dialed by a user at MS 80. In response to such a feature code, SCP 84 may notify SN 70 that the user is either available or not, and SN 70 may communicate this status to IM server 68.

As still another example, the SCP or another entity could interface with a personal information manager (PIM) associated with the user. The PIM may be maintained by a computer on IP network 62, by SCP 84 or elsewhere (e.g., on SN 70), and it may indicate dates and times when the user will or will not be available for instant messaging. At those specified dates/times, an entity such as SCP 84 and/or SN 70 may accordingly send registration or de-registration messages to IM server 68.

Once IM server 68 receives an indication that MS 80 is available for instant messaging, the IM server may notify other IM clients that MS 80 is logged onto the instant messaging system and available to receive instant messages. For example, IM server 68 may send a signal to IM client terminal 64 with this indication, perhaps if the user logged on at terminal 64 had indicated an interest in knowing when MS 80 was on line. Terminal 64 might then display on its monitor an indication that MS 80 is available, possibly with graphical or text indicia specifying that MS 80 is a wireless IM client.

As another possibility, IM server 68 might provide terminal 64 with an indication of the destination IM address for MS 80. The IM client application on terminal 64 may then store this information for use in the event a user at terminal wants to send an instant message to MS 80. Alternatively, for better security, the IM server may retain this information itself and only use it to facilitate routing instant messages when such messages are sent.

In the exemplary embodiment, once registration occurs or at another appropriate time, a user at IM client terminal 64 may enter a text message to be sent as an instant message to a user at MS 80. To do so, for instance, the user at terminal 64 might invoke an IM client application, select MS 80 as the destination IM client (and/or the user at MS 80 as the destination user (e.g., per the user ID indicated in the IM registration message), type in a text message, and click a "send" button.

To allow the user to select a destination IM client such as MS 80, IM client terminal 64 may, for instance, display a list of available IM recipients. The list may provide a graphical icon for each potential recipient, adjacent to a user name for instance. The IM client may then allow the user to select a given recipient by, for instance, clicking a mouse pointer on a desired icon or user name. (In the exemplary embodiment, the sending user need not know that the recipient is a mobile station and need not know the ID (e.g., directory number) of the recipient.)

In response, the IM client application on terminal 64 may then interact with IM server 68 to determine the network location to which the instant message should be routed, unless the IM client knows this information already. Alternatively, the IM client may send the instant message to the IM server to be routed in turn to the destination IM address. In either case, in the exemplary embodiment, the text message (e.g., as a text string) could be sent as payload in a packet sequence, via IP network 62, to the destination IM address, which is preferably the IP address and IM port of interface 88 at SN 70.

In the exemplary embodiment, an instant message received from IP network 62 by SN 70 will include (i) a destination indication, (ii) the text message (or other payload), and (iii) a return ID. Each of these elements may take various forms. The destination indication, for instance, may be the user name of the wireless IM client, e.g., "MS 80" (or the name of the user at MS 80) or some other information that SN 70 can associate with that wireless IM client. As other examples, the destination indication could be the directory number or another network address (e.g., an IP address, etc.) of the wireless IM client. The text message may be the text message provided by the user at terminal 64.

The return ID is preferably some indicator of the message originator, as a type of return address. The return ID should preferably be sufficient to allow a response message from MS 80 to be directed to the message originator. For this purpose, the return ID could be an IP address/port, a user name, or any other suitable indicator of the originating end. Alternatively, the return ID could be a code number assigned by IM server 68, which uniquely identifies terminal 64, for instance. In this regard, the return ID might be understandable only to the IM server; alternatively, it could be understandable to SN 70 as well. In addition, if SN 70 interfaces with multiple IM servers (e.g., IM servers owned and operated by a number of different companies), or if otherwise desired, the return ID could include an indicator of the IM server/system to which a response message can be directed.

It should be appreciated, however, that the incoming instant message to SN 70 may take other forms. For instance, it might have only a destination indication and a text message, and some other means might be provided if desired to correlate the message with its sender. In part, for example, SN 70 might know the identity of the IM server based on the port on which the message arrived or based on an IP address in the message header.

Upon receipt of this origination message, SN 70 will preferably parse the message into its components. The SN will preferably understand the destination indicator to indicate MS 80. If the destination indicator is the directory number of MS 80, this is a simple task. Otherwise, SN 70 might cross-reference an internal or external table to determine the directory number/routing number of MS 80 based on the destination indicator. (For example, a centralized database may be provided to correlate mobile station destination indicators (e.g., user IDs) with directory numbers of the mobile stations. Alternatively, IM server 68 could perform this translation if necessary before the origination message is sent to SN 70).

In the exemplary embodiment, the SN 70 will assign a callback number to the message. The callback number will be keyed to (i.e., pointing to) a port of interface 90 on SN 70. The callback number preferably comprises a dial up number of the SN, so that the SN can be conveniently reached from anywhere in the telecommunications network. As an example, the callback number could be an 800 or other toll-free number. Alternatively, if MS 80 subscribes to instant message service provided by the same carrier who operates the SN, for instance, the callback number could simply be a code number that could be translated/interpreted (e.g., by reference to SCP 84) into a routing number of the port of interface 90 on SN 70.

In addition, the SN preferably establishes a WIM key for this IM session. As noted above, the WIM key could be the MIN (e.g., directory number) of MS 80 or some other code keyed to MS 80, preferably in combination with the callback number. As further noted, this combination of MIN/callback number will advantageously reduce the number of callback numbers that need to be set aside for use in routing return instant messages to SN 70.

SN 70 then preferably stores the WIM key in a record in its IM database 98, together with an indication of the return ID for the message. By doing so, SN 70 thus establishes a record or "correlation" for a pending IM session, which, in the exemplary embodiment, identifies where to send a response IM message that might be provided by MS 80. In particular, by reference to the WIM key, SN 70 can identify the corresponding return ID and therefore be able to send a response message to an appropriate destination (or destinations).

In the exemplary embodiment, SN 70 will turn the text message that it received from IP network 62 into an SMS message. In particular, it will preferably prepare an SMDPP message bearing the text message as payload and the routing number of MS 80 as destination address. In addition, in accordance with the exemplary embodiment, SN 70 will insert the callback number in the SMDPP header as the SMS_OriginatingAddress.

SN 70 will then send the SMDPP message to SMSC 86, which will in turn send an SMDPP message to MSC 74, which will then deliver the SMS message to MS 80. (As an alternative, the SN could be arranged to send an SMDPP directly to MSC 74, thus serving as an SMSC). Advantageously, the SMS message might be sent to MS 80 regardless of where in the telecommunications network MS 80 is located, and whether or not MS 80 is operating within a serving system owned and operated by the same company that owns and operates SN 70. Under basic IS-41 principles, the SMS message could be delivered through one or more SMSCs possibly through a BMG as well, and ultimately to the destination SME on MS 80.

In an exemplary embodiment, MS 80 may conventionally display an indication of the SMS_OriginatingAddress in conjunction with the SMS message. This indication could be the actual assigned callback number (i.e., the routing number of the port on SN 70). However, since this callback number is likely to be meaningless to the user at MS 80, the indication could instead take some other form, such as the phrase "Speak Reply" or the phrase "Reply," for instance. The MS, the MSC or some other entity could make this conversion. Alternatively, the MS might not be arranged to display any indication of the SMS_OriginatingAddress.

MS 80 will preferably enable the user to automatically place a call to the callback number, such as by pressing a function key on MS 80. This can done through standard means, and many existing mobile stations already provide this capability.

Thus, once the user at MS 80 receives the instant message in the form of an SMS message for instance, the user may engage the callback feature to place a call to the callback number, i.e., to a port of interface 90 on SN 70. When the user engages this feature, MSC 74 will typically receive a call origination request from MS 80, and MSC 74 will responsively engage in call setup signaling communication with SN 70. As is well known in the art, such call setup signaling may involve an exchange of ISDN User Part (ISUP) over an SS7 signaling network. Once the call path is set up, MSC 74 will connect the call, thereby establishing a voice communication channel between MS 80 and SN 70.

When SN 70 receives this call (or is receiving the call), it may determine the MIN (directory number) of the calling mobile station through conventional automatic number identification (ANI) techniques. However, if the ANI is not available (e.g., if MF trunks are not present or the ANI is lost or masked in a landline PBX, for instance) or if otherwise desired, then the SN may prompt the user to key in or speak the MIN or other such identifier. The SN may then determine the WIM key associated with this message, being either some combination of the MIN and the callback number of the port on which the call arrived, or simply the MIN, or simply the callback number, or some other designated indication. Provided with this WIM key, the SN may then query its IM database 98 to determine the return ID for the response message.

Once the voice channel is established between SN 70 and MS 80, the IVRU 100 may conveniently prompt the user at MS 80 to speak a response to the instant message, and the user may do so. In a possible arrangement, the IVRU may then allow the user to replay the response message, such as by prompting the user to enter DTMF tones or speak commands that would be interpreted by the IVRU, and the IVRU could then replay the message for approval by the user. To facilitate voice-band communication with the user, the IVRU may employ speech-to-text technology, for instance.

In the exemplary embodiment, SN 70 then preferably records the user's spoken response message in a compressed audio file. The compressed audio file should preferably be of a form that is standard among most IM clients. An example of this could be the well known WAV file format. Another example, however, might be CDMA encoding. Still other examples might exist or be developed later as well. The SN may restrict the length (and size) of the audio file if desired.

In turn, the SN then preferably generates an instant message with the compressed audio file as an attachment and sends the instant message into IP network 62, for ultimate receipt by the IM client on terminal 64. In the exemplary embodiment, the return ID will indicate (e.g., define the IP address of) the IM client that sent the initial message. Thus, acting in its IM client capacity, SN 70 may send the instant message to that IM client, by transmitting a sequence of packets into the IP network 62. The payload of the packet sequence will preferably comprise or represent at least the response audio message but may also include other information as well. Thus, the audio response message may be viewed as being encapsulated in the instant message response.

SN 70 may thus use the return ID to direct the response message to terminal 64. SN 70 may, for instance, transmit the packet sequence directly (i.e., through IP network 62) to terminal 64, particularly where the return ID defines a network address of terminal 64. Alternatively, SN 70 might send the instant message to IM server 68, which may then read and possibly interpret the return ID and then forward the instant message to terminal 64. Alternatively, SN 70 might receive from IM server 68 an indication of where terminal 64 is located and may then route the instant message itself to terminal 64. Other variations on transmission of the response message can exist as well.

When the IM client on terminal 64 receives the response instant message, it may conventionally pop up a message on the monitor of the terminal for presentation to a user. Further, in the exemplary embodiment, the IM client will automatically play the attached compressed audio file, thereby playing the spoken response of the MS user to through the speakers of terminal 64. Alternatively, upon receipt of the instant message, a user at terminal 64 may be required to manually engage an audio player to play the compressed audio file (as with a conventional e-mail attachment for instance). In turn, the user at terminal 64 may respond once again, by sending another instant message to the user at MS 80.

Figure 8:
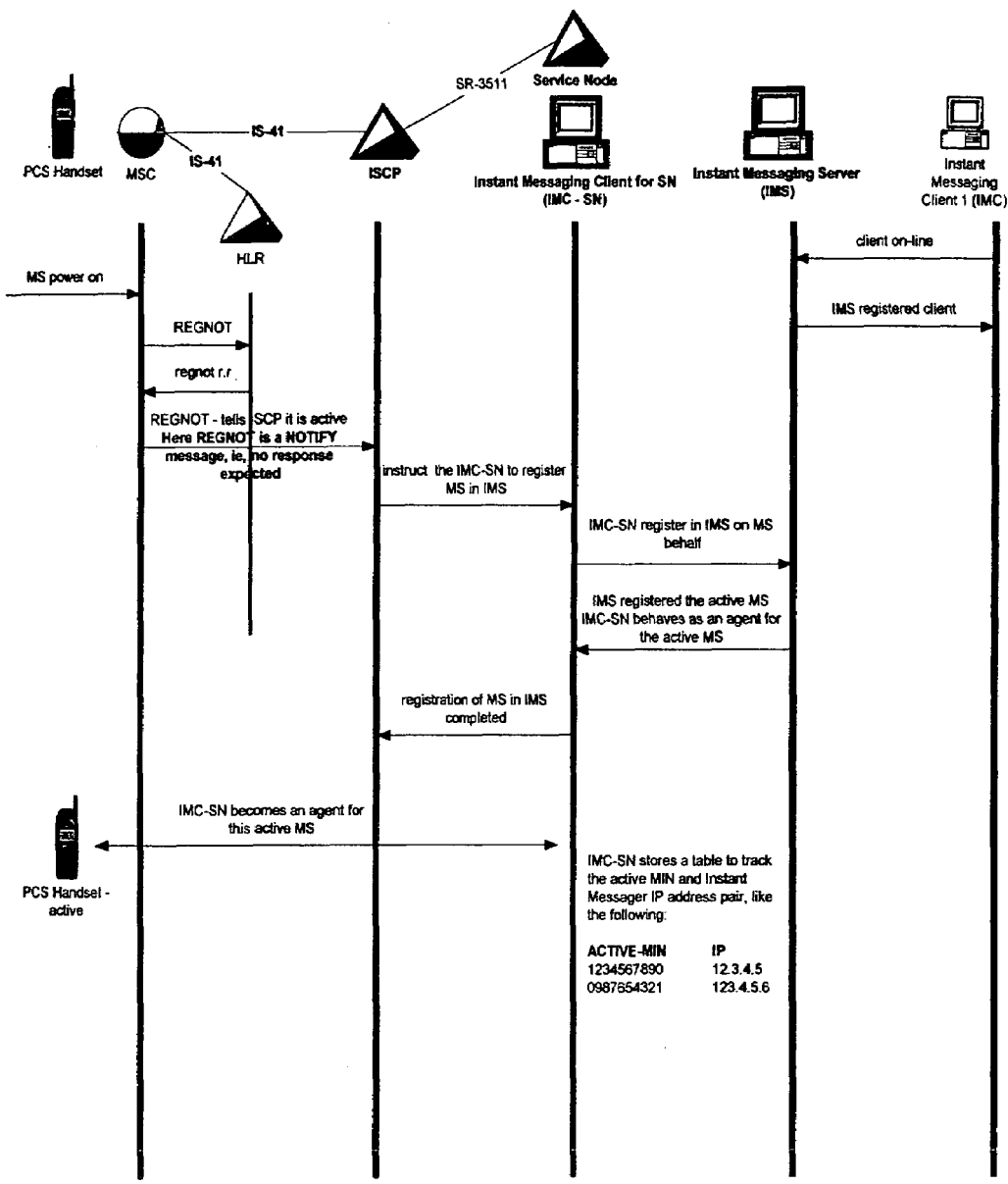
FIGS. 8–11 are call flows depicting exemplary messaging that may occur according to an embodiment of the present invention.

Referring now to FIGS. 8–11, there are illustrated a set of call flow charts, which depict message flow between network elements in accordance with exemplary embodiments of the invention. FIG. 8 first depicts a set of exemplary messaging involved with registering a wireless IM client such as MS 80 with an IM server such as IM 68. As shown in FIG. 8, when MS 80 is powered on (or in response to a feature code or other directive provided by a user, for instance), MSC 74 sends a REGNOT message to HLR 82, and HLR 82 returns a regnot response message. MSC 74 then sends a REGNOT message to SCP 84, telling SCP 84 that MS 80 is active. In response, SCP 84 then sends a signaling message to SN 70, instructing the SN to register MS 80 with IM server 68. SN 70 then sends a message to IM server 68 to register the wireless IM client. In this way, SN 70 thus becomes an IM agent for the active wireless IM client, MS 80.

Figure 9:
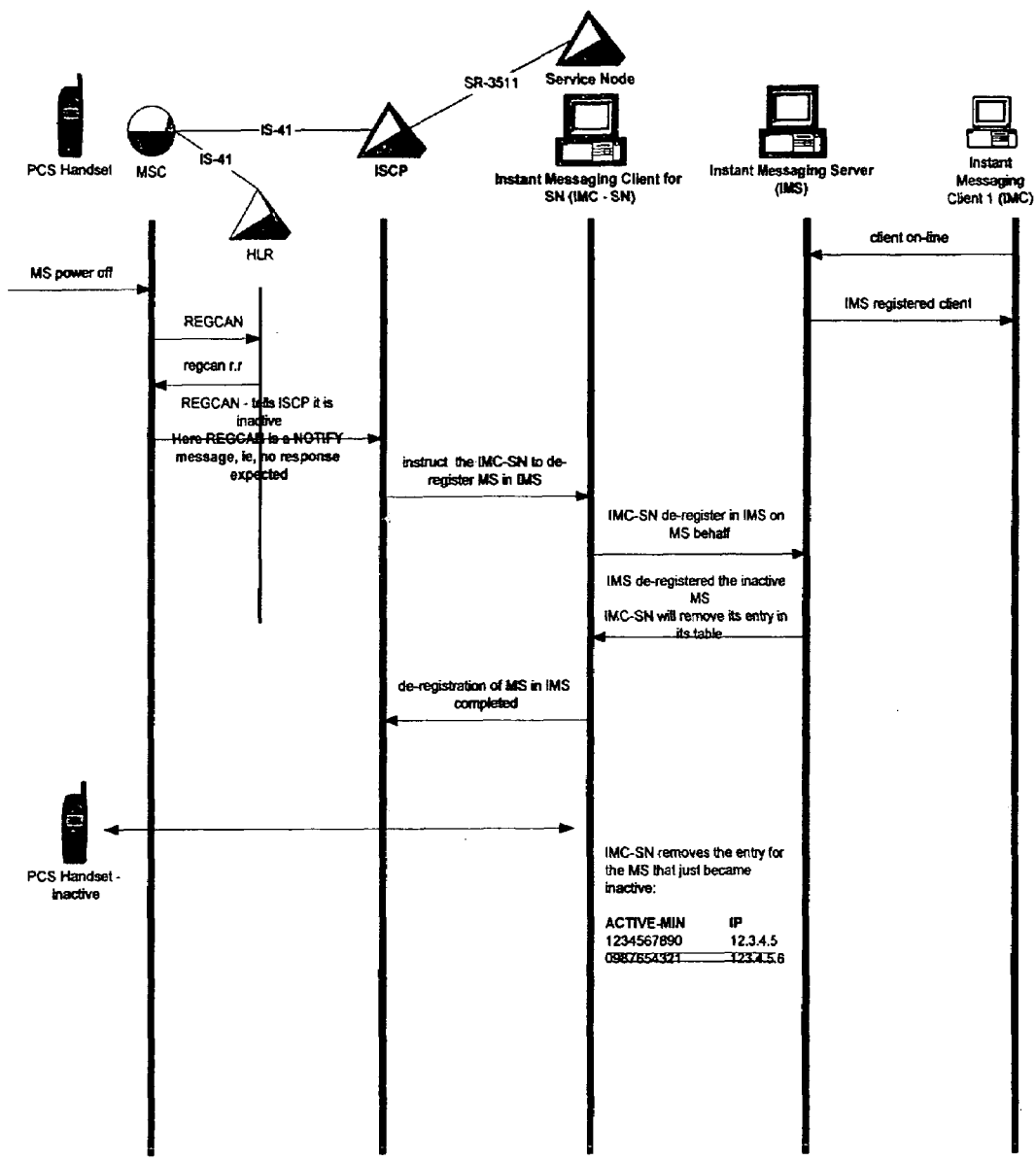

FIG. 9 next depicts a set of exemplary messaging involved with de-registering the wireless IM client from IM server 68. As shown in FIG. 9, when MS 80 powers down or otherwise becomes unavailable for IM service (or in response to a feature code or other directive provided by a user, for instance), MSC 74 sends a REGCAN (RegistrationCancellation) message to SCP 84. SCP 84 then instructs SN 70 to de-register the MS, and SN 70 sends a message to IM server 68 to de-register the wireless IM client.

Figure 10:
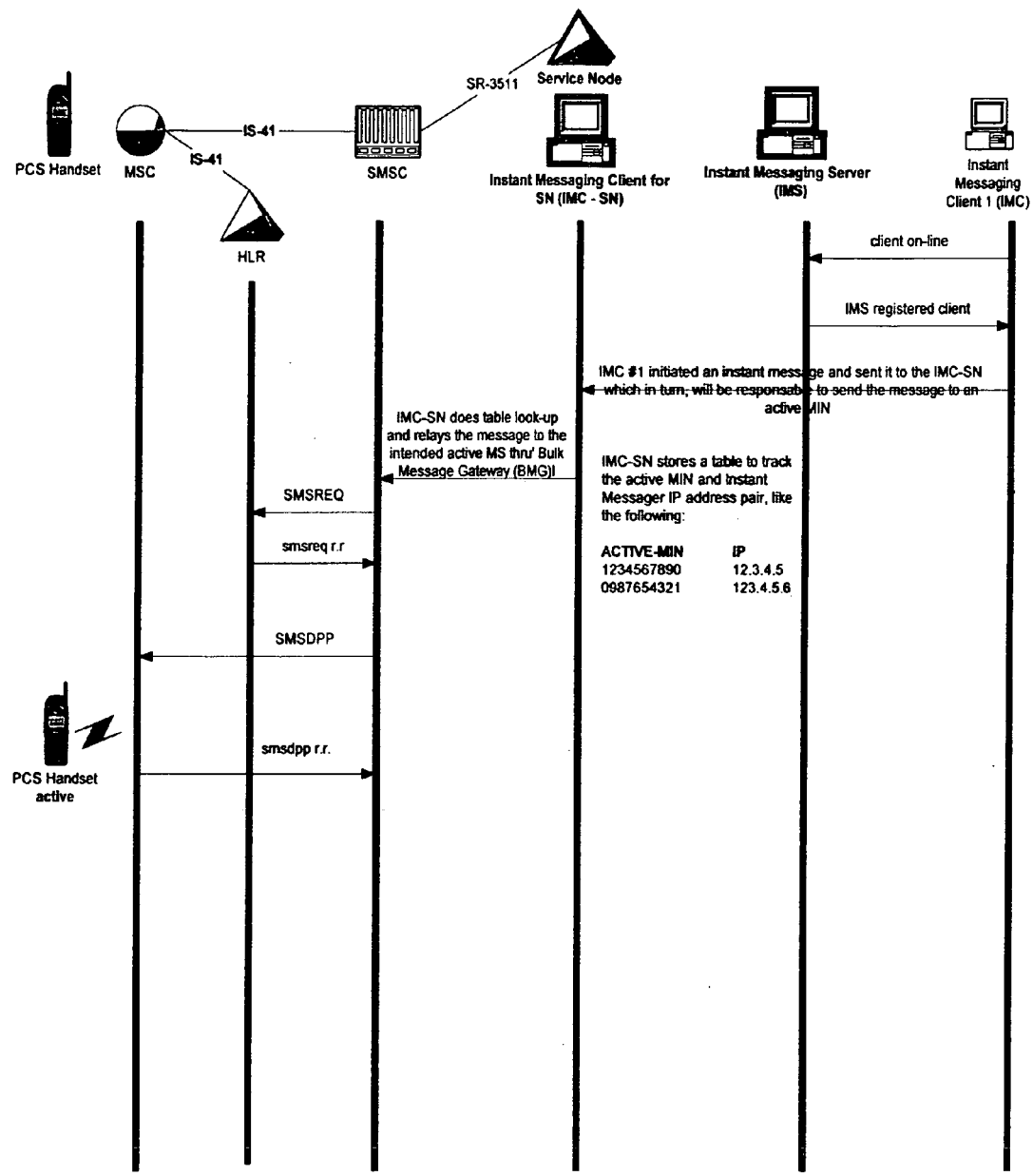

FIG. 10 next illustrates a set of exemplary messaging involved when an IM client at terminal 64 sends an instant message to MS 80. As shown in FIG. 10, the IM client sends an instant message to "IM client" SN 70. SN 70 then does a table lookup and relays the message to the intended wireless IM client, MS 80, possibly through a BMG and one or more SMSCs. Finally, MSC 74 delivers the SMS message to MSC 80, and the message is displayed for reading by a user.

Figure 11:
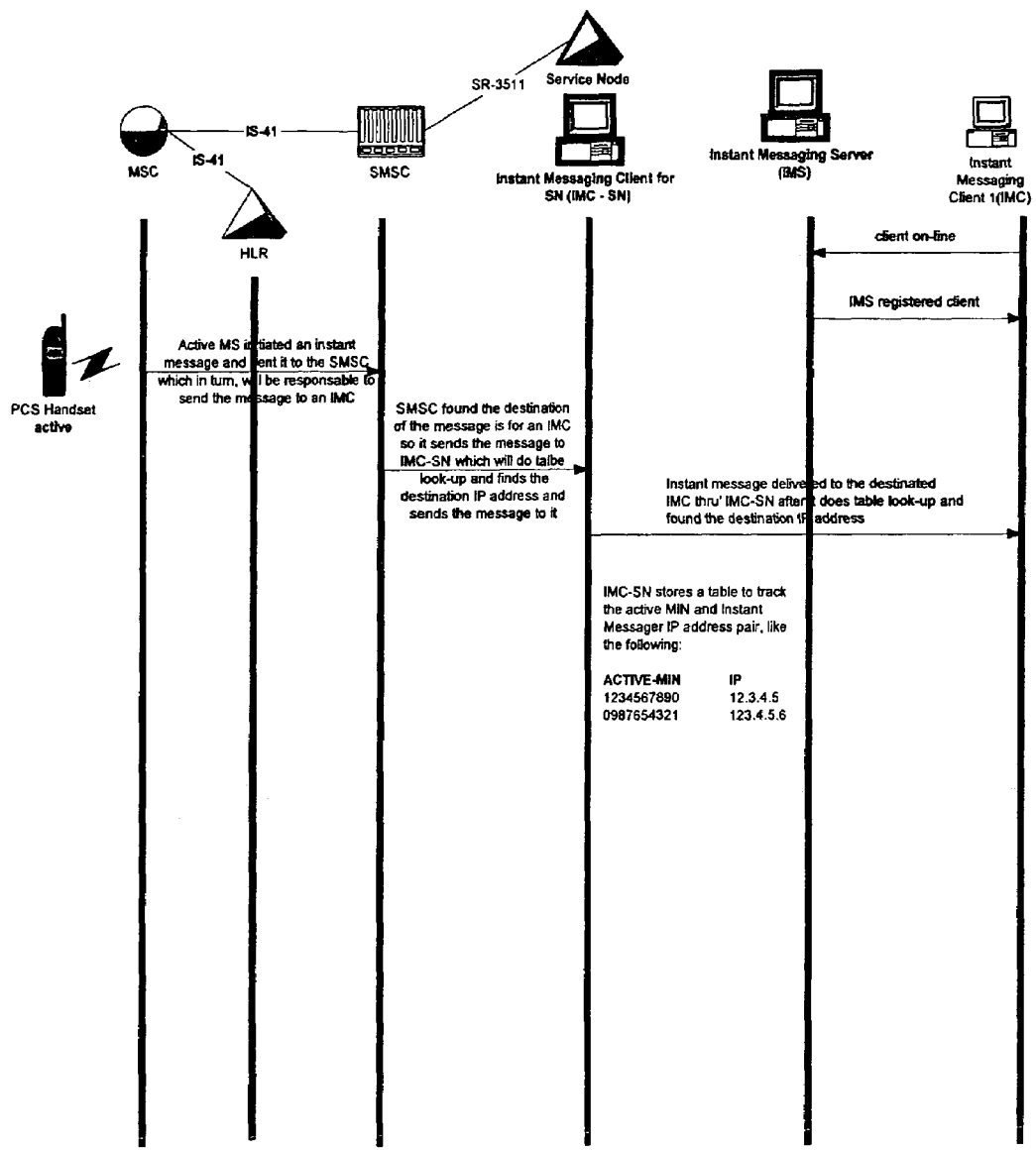

Finally, FIG. 11 illustrates a set of exemplary messaging involved when an active wireless IM client sends an instant message to an IM client on terminal 64. As shown there, MSC 74 will receive the SMS message from MS 80 and forward it in an SMDPP message to SMSC 86. SMSC 86 will then determine that the SMS message destination is an IM client, so SMSC 86 will forward the SMS message to SN 70. SN 70 will then do a table lookup or may interact with IM 68 and thereby determine the network location of terminal 64. Finally, SN 70, in its capacity as an IM client, will send the instant message to the IM client on terminal 64, where it will be displayed for presentation to a user.

In summary then, the exemplary embodiment allows a user at a traditional IM client to conventionally send an instant text message to a user at a wireless IM client. In turn, the exemplary embodiment allows the user at the wireless IM client to readily send an instant message to the first user. Advantageously, with the exemplary embodiment, the user at MS 80 need not fumble with entering text messages via a numeric keypad. Further the user at MS 80 need not engage in an on-line WAP/HDML session in order to participate in instant messaging.

It should be understood that the form of the messages and communication procedures as presently contemplated can vary from those described. For instance, when SN 70 receives a spoken instant message from a user at MS 80, the speech/text converter 102 of SN 70 can be arranged to convert the spoken message to a text message. SN 70 may then send a more conventional instant message text response via IP network 62 to the user at terminal 64. In this way, it could seem to the user at terminal 64 that normal text instant messaging is passing back and forth between terminal 64 and the user at MS 80.

Further, recent and ongoing advances in video technology can facilitate extending the present invention to allow a MS user to respond with a video message as well. In this respect, the MS would likely employ a video camera or some other video source to generate a video message, and the SN would be arranged to receive and send the instant video message to terminal 64 for display to a user.

As another example, rather than sending the spoken response as a compressed audio file, SN 70 can be arranged to stream the spoken response to a media player at terminal 64, which can be arranged to automatically play the streamed audio. In this way, a user at terminal 64 may send a text instant message to the user at MS 80, and terminal 64 may then automatically play the MS user's spoken response. The same can be the case for a video message.

Still further, although the foregoing describes a procedure for a user at a mobile station to readily send a response to an instant message, the exemplary embodiment also extends to allow a user at a mobile station to initiate an instant message session. For instance, the user could call a specified number associated with SN 70, for example, and then speak a message. SN 70 can then send an audio, text or other version of the message as an instant message to a designated terminal on IP network 62 or elsewhere.

As another alternative, the return message provided by SN 70 could also include location information, indicating the location of MS 80. As noted above, this information can be determined by MPC 85. Thus, for instance, SN 70 could send a message to SCP 84 requesting the location of MS 80, SCP 84 could get the location from MPC 85, and the location can be passed back in a response message to SN 70. SN 70 might then include with the response instant message (as a graphical map attachment, as a supplemental text "add on", or in some other form) an indication of where MS 80 is located. The IM client on terminal 64 may then provide this additional information to the user.

Still additionally, SN 70 could include or be coupled with a message store that provides predetermined messages, such as text, audio or video messages. The SN may then be programmed to use various "canned" messages from the message store at least in part as responses to instant messages. It is possible, for instance, that a user at MS 80 could send an instant message via SN 70 as described above, and SN 70 could append an advertisement or other message to the instant message. Thus, what the destination IM client receives might include an advertisement followed by the MS user's instant message. As another example, SN 70 could create messages that are more complex combinations of user-provided material and predefined material.

Still further, although the exemplary embodiment has been described in the context of providing instant messaging service for a wireless IM client, the invention can be equally extended to use for applying instant messaging service for other entities. Such other entities could include, without limitation, conventional landline telephones for instance.

Additionally, while the exemplary embodiment has been described in terms of "instant" messaging, the invention can extend as well to use for other types of messaging. For example, to send an e-mail message to a mobile station, an e-mail client on the Internet might send the e-mail message to SN 70, as a proxy for the mobile station. SN 70 may then convert the e-mail message into an SMS message and forward it to the mobile station, with a callback number that allows a user at the mobile station to readily call SN 70 and speak a response. As described above, SN 70 may then send the response message to the e-mail client on the Internet.

Still additionally, while the foregoing has focused on the communication of instant messages between a pair of users, at least one of which is at a mobile station, the invention could equally extend to facilitate communication between three or more parties at once, thereby providing for real-time conferencing. To provide this functionality, an entity such as the IM server and/or the SN could serve as a conference bridge, maintaining a record of the parties to a conference and then multicasting instant messages between the conference participants.

An exemplary embodiment of the present invention has thus been illustrated and described. It will be understood, however, that changes and modifications may be made to the invention as described without deviating from the spirit and scope of the invention, as defined by the following claims.

We claim:

1. A messaging method comprising, in combination:
  maintaining at an instant messaging (IM) network server a registration record indicating that a second station is available to receive messages, but pointing to an IM client proxy address as an address to which messages destined for the second station should be sent;
  the IM client proxy receiving a first message provided by a first station and destined for second station;
  the IM client proxy converting the first message to an SMS message and sending the SMS message to the second station;
  the IM client proxy receiving a spoken response message from the second station; and
  the IM client proxy sending the spoken response message to the first station.

2. A messaging method as claimed in claim 1, wherein the first message defines a return ID associated with the first station, the messaging method further comprising:
  in response to the first message, the IM client proxy storing a correlation between the return ID and the second station;
  when the IM client proxy receives the spoken response message from the second station, the IM client proxy determining the return ID based on the correlation; and
  the IM client proxy using the return ID to direct the spoken response message to the first station.

3. A messaging method as claimed in claim 2, wherein the return ID comprises a network address of the first station.

4. A messaging method as claimed in claim 3, wherein the network address of the first station comprises an IP address.

5. A messaging method as claimed in claim 2, wherein storing a correlation between the return ID and the second station comprises storing a data record including an indication of the return ID and an indication of the second station.

6. A messaging method as claimed in claim 5, wherein the indication of the second station comprises a mobile identification number of the second station.

7. A messaging method as claimed in claim 5, further comprising:
  the IM client proxy providing in the SMS message a callback number pointing to a port at the IM client proxy;
  the IM client proxy receiving a call to the callback number from the second station; and
  wherein, receiving a spoken response message from the second station comprises receiving the spoken response message via the call to the callback number.

8. A messaging method as claimed in claim 1, wherein the second station comprises a mobile station.

9. A messaging method as claimed in claim 8, wherein the second station comprises a wireless telephone.

10. A messaging method as claimed in claim 8, wherein the second station comprises a computer with a wireless modem.

11. A messaging method as claimed in claim 1, wherein:
  the first station comprises a computer terminal on a packet switched network;

the IM client proxy is also on the packet switched network; and receiving the first message comprises receiving a packet sequence carrying the first message.

12. A messaging method as claimed in claim 1, wherein the first message comprises a text string.

13. A messaging method as claimed in claim 1, wherein converting the message to an SMS message comprises extracting a text string from the message and inserting the text string as payload in an IS-41 SMDPP message.

14. A messaging method as claimed in claim 1, further comprising the IM client proxy recording the spoken response in a compressed audio file, wherein sending the spoken response message as at least part of a response message to the first station comprises sending the compressed audio file as at least part of the response message.

15. A messaging method as claimed in claim 14, wherein sending the spoken response message comprises sending a packet sequence representing payload, the payload comprising the compressed audio file.

16. A messaging method as claimed in claim 14, wherein the compressed audio file comprises a WAV file.

17. A messaging method as claimed in claim 1, wherein the second station is a mobile station, the method further comprising, in combination:
   the IM client proxy receiving an indication of a location of the mobile station; and
   the IM client proxy sending to the first station, together with the spoken response message, an indication of the location of the mobile station,
   whereby, the first station may present, together with the spoken response message, an indication of the location of the mobile station.

18. A method of facilitating communication between a first terminal and a second terminal, the method comprising, in combination:
   at an IM server, maintaining a registration record indicating that the second terminal is available to receive messages, but pointing to a proxy address defined by an IM client proxy as an address to which messages destined for the second terminal should be sent;
   receiving at the proxy address a first message provided by the first terminal, the message comprising (i) a return address associated with the first terminal, (ii) a destination address associated with the second terminal, and (iii) payload;
   the IM client proxy recording a correlation between the return address and the second terminal;
   the IM client proxy sending at least a portion of the payload to the second terminal;
   the IM client proxy thereafter receiving from the second terminal a response message, and, based on the correlation, the machine identifying the return address; and
   the IM client proxy sending to the return address, for receipt by the first terminal, a second message embodying the response message.

19. A wireless messaging method comprising:
   at a machine, registering a mobile station as being available to receive a message;
   maintaining a registration record at the machine indicating that the mobile station is available to receive messages, but pointing to a proxy address of the machine as an address to which messages destined for the mobile station should be sent;
   receiving at the machine a first message provided by the first terminal and destined for the mobile station, the first message comprising a payload;
   storing a data record that correlates the mobile station with the first terminal;
   sending the payload to the mobile station, whereby the payload may be presented to a user at the mobile station;
   establishing a call connection between the mobile station and the machine;
   via the call connection, receiving a spoken response message from a user at the mobile station; and
   sending to the first terminal a message embodying the spoken response message.

20. A wireless messaging method as claimed in claim 19, wherein registering a mobile station as being available to receive a message comprises registering a user at the mobile station as being available to receive a message.

21. A method of facilitating communication between a first machine and a second machine, wherein at least the second machine comprises a mobile station, the method comprising, in combination:
   sending a registration message to a messaging server so as to register the second machine as being available to receive messages, the registration message providing (a) an ID associated with the second machine and (b) a network address associated with a third machine, whereby wherein the message server maintains a registration record indicating that the second machine is available to receive messages but pointing to the network address associated with the third machine as an address to which messages destined for the second machine should be sent;
   receiving at the third machine a set of data packets representing a message provided by the first machine, the data packets defining at least (i) a return address associated with the first machine and (ii) payload;
   the third machine generating an SMS message carrying at least a portion of the payload and including in the SMS message a callback number associated with the third machine;
   the third machine sending the SMS message to the second machine;
   the third machine thereafter receiving a call placed from the second machine to the callback number and, via the call, receiving a spoken response message from a user at the second machine; and
   the third machine sending the spoken response message to the return address, for receipt by a user at the first station.

22. A method as claimed in claim 21, wherein the ID identifies a user at the second machine and is thereby associated with the second machine.

23. A method as claimed in claim 21, wherein the ID identifies the second machine.

24. A method as claimed in claim 21, wherein the network address associated with the third machine comprises an IP address.

25. A method as claimed in claim 21, wherein the return address associated with the first machine comprises a network address of the first machine.

26. A method as claimed in claim 25, wherein the return address associated with the first machine comprises an IP address.

27. A method as claimed in claim 21, wherein the payload destined for the second machine comprises a text message.

28. A method as claimed in claim 21, further comprising the third machine storing a data record correlating the return address with a messaging key that is based at least in part on a network address of the second machine, wherein when the third machine receives the call from the second machine, the third machine may identify the network address of the second machine and, based at least on the network address of the second machine, retrieve the return address.

29. A method as claimed in claim 28, wherein the network address of the second machine comprises a directory number.

30. A method as claimed in claim 21, further comprising, in combination:
the third machine storing a data record correlating the return address with a messaging key that is based at least in part on a network address of the second machine; and
when the third machine receives the call from the second machine, the third machine identifying the network address of the second machine and, based at least in part on the network address of the second machine, retrieving the return address.

31. A method as claimed in claim 21, wherein the payload comprises a text message.

32. A method as claimed in claim 21, wherein generating the SMS message comprises generating an IS-41 SMDPP message carrying at least a portion of the text message.

33. A method as claimed in claim 21, wherein the third machine sending the SMS message to the second machine comprises the third machine sending the SMS message to a message center for transmission to the second machine.

34. A method as claimed in claim 21, further comprising recording the spoken response message as a compressed audio file.

35. A method as claimed in claim in 34, wherein the compressed audio file comprises a WAV file.

36. A method as claimed in claim 21, wherein sending the spoken response message to the return address comprises generating a set of data packets representing the spoken response message, and sending the data packets into a network.

37. A method as claimed in claim 21, wherein sending the spoken response message to the return address comprises streaming the spoken response to the return address.

38. A wireless instant messaging (IM) system comprising, in combination:
an IM server coupled with a network;
an IM client proxy coupled with the network, the IM client proxy defining an IM client proxy address;
a mobile station;
the IM server maintaining a registration record indicating that the mobile station is available to receive messages but pointing to the IM client proxy address as an address to which messages destined for the mobile station should be sent;
the IM client proxy receiving from the network a message provided by a sender on the network and destined for the mobile station, and the IM client proxy responsively sending the message to the mobile station;
the mobile station receiving the message sent from the IM client proxy and presenting the message to a user;
the mobile station placing a call to the IM proxy;
the IM proxy receiving, via the call, a spoken response message; and
the IM client proxy sending the spoken response message to the sender on the network.

39. A wireless instant messaging (IM) system comprising, in combination:
an IM server coupled with a network;
an IM client proxy coupled with the network, the IM client proxy defining an IM client proxy address;
the IM server being configured to maintain a registration record indicating that a mobile station is available to receive messages, but pointing to the IM client proxy address as an address to which messages destined for the mobile station should be sent;
the IM client proxy being configured to (a) receive from the network a first message provided by a sender on the network and destined for the mobile station, (b) send at least a portion of the first message to the mobile station in response to receiving the first message, (c) receive, via a call, a spoken response message from the mobile station, and (d) send the spoken response message to the sender on the network.

40. The wireless IM system of claim 39, wherein the IM client proxy is further configured to (e) store a correlation between a return ID of the first message and the second station and (f) in response to receiving the spoken response message, determine the return ID based on the correlation.

41. The wireless IM system of claim 39, wherein the IM client proxy is further configured to (g) convert a payload of the first message to an SMS message and (h) include a IM client proxy callback number with the SMS message, wherein the at least a portion of the first message sent to the mobile station is the SMS message, and wherein the call is a call to the callback number.

42. The wireless IM system of claim 39, wherein being configured to send the spoken response message to the sender comprises being configured to send a compressed audio file to the sender.

43. The wireless IM system of claim 39, wherein being configured to receive a spoken response message comprises:
being configured to establish a call connection between the mobile station and the IM client proxy; and
being configured to receive a spoken message from a user at the mobile station via the call connection.

44. The wireless IM system of claim 39 further comprising a mobile positioning center for providing an indication of a location of the mobile station, wherein the IM client proxy is further configured to (i) send the indication of the location of the mobile station to the sender, together with the spoken response message.

45. The messaging method of claim 1, wherein the spoken response message is received in response to the SMS message being sent to the second station.

* * * * *